(12) United States Patent
Ramaratnam et al.

(10) Patent No.: US 12,123,148 B2
(45) Date of Patent: ***Oct. 22, 2024

(54) FLUSHABLE WIPE AND METHOD OF FORMING THE SAME

(71) Applicant: First Quality Tissue, LLC, Great Neck, NY (US)

(72) Inventors: Karthik Ramaratnam, Anderson, SC (US); James E. Sealey, II, Belton, SC (US); Byrd Tyler Miller, IV, Easley, SC (US); Taras Z. Andrukh, Greenville, SC (US); Justin S. Pence, Anderson, SC (US)

(73) Assignee: First Quality Tissue, LLC, Great Neck, NY (US)

( * ) Notice: Subject to any disclaimer, the term of this patent is extended or adjusted under 35 U.S.C. 154(b) by 118 days.

This patent is subject to a terminal disclaimer.

(21) Appl. No.: 17/840,280

(22) Filed: Jun. 14, 2022

(65) Prior Publication Data

US 2022/0316142 A1    Oct. 6, 2022

Related U.S. Application Data

(62) Division of application No. 14/715,350, filed on May 18, 2015, now Pat. No. 11,391,000.

(Continued)

(51) Int. Cl.
*D21H 27/40* (2006.01)
*A47L 13/16* (2006.01)
(Continued)

(52) U.S. Cl.
CPC .............. *D21H 27/40* (2013.01); *A47L 13/16* (2013.01); *A47L 13/17* (2013.01); *B32B 3/30* (2013.01);
(Continued)

(58) Field of Classification Search
CPC ........ D21H 27/40; D21H 27/36; D21H 21/56; D21H 27/007; D21H 27/32; D21H 27/34;
(Continued)

(56) References Cited

U.S. PATENT DOCUMENTS 2,919,467 A    1/1960    Mercer
2,926,154 A    2/1960    Keim
(Continued)

FOREIGN PATENT DOCUMENTS

CA    2168894 A1    8/1997
CA    2795139       10/2011
(Continued)

OTHER PUBLICATIONS

Supplementary European Search Report of EP15792709 dated Nov. 13, 2017.
(Continued)

*Primary Examiner* — Jose A Fortuna
(74) *Attorney, Agent, or Firm* — Amster, Rothstein & Ebenstein LLP

(57) ABSTRACT

A multi-ply flushable wipe includes a ply having first and second exterior layers and a middle layer disposed therebetween. Each of the exterior layers includes at least 50% by weight natural fibers. When foam-formed, the middle layer includes at least 25% by weight natural fibers. In embodiments, the middle layer may include at least 75% by weight natural fibers. The middle layer also includes synthetic fibers that have a length within the range of 1 mm and 20 mm. The wipe may have a length weight weighted average fiber length of less than 4 mm and a wet CD strength of greater than 20 N/m. Each ply of the wipe may be formed by wetlaying the first and second exterior layers and a foam (Continued)

formed middle layer to form a web, imprinting the web with a structured fabric, and drying the web. The plies are then attached using a binder.

7 Claims, 4 Drawing Sheets

Related U.S. Application Data

(60) Provisional application No. 61/994,563, filed on May 16, 2014.

(51) Int. Cl.
| | |
|---|---|
| A47L 13/17 | (2006.01) |
| B32B 3/30 | (2006.01) |
| B32B 5/02 | (2006.01) |
| B32B 5/06 | (2006.01) |
| B32B 5/08 | (2006.01) |
| B32B 5/22 | (2006.01) |
| B32B 5/24 | (2006.01) |
| B32B 5/26 | (2006.01) |
| B32B 29/00 | (2006.01) |
| B32B 29/02 | (2006.01) |
| D21F 11/00 | (2006.01) |
| D21H 17/36 | (2006.01) |
| D21H 21/56 | (2006.01) |
| D21H 27/00 | (2006.01) |
| D21H 27/32 | (2006.01) |
| D21H 27/34 | (2006.01) |
| D21H 27/38 | (2006.01) |

(52) U.S. Cl.
 CPC ............... *B32B 5/02* (2013.01); *B32B 5/06* (2013.01); *B32B 5/08* (2013.01); *B32B 5/22* (2013.01); *B32B 5/245* (2013.01); *B32B 5/26* (2013.01); *B32B 29/007* (2013.01); *B32B 29/02* (2013.01); *D21F 11/002* (2013.01); *D21H 17/36* (2013.01); *D21H 21/56* (2013.01); *D21H 27/007* (2013.01); *D21H 27/32* (2013.01); *D21H 27/34* (2013.01); *D21H 27/38* (2013.01); *B32B 2260/021* (2013.01); *B32B 2260/046* (2013.01); *B32B 2262/02* (2013.01); *B32B 2262/0223* (2013.01); *B32B 2262/0253* (2013.01); *B32B 2262/0276* (2013.01); *B32B 2262/06* (2013.01); *B32B 2262/065* (2013.01); *B32B 2262/067* (2013.01); *B32B 2262/08* (2013.01); *B32B 2262/14* (2013.01); *B32B 2307/54* (2013.01); *B32B 2307/7163* (2013.01); *B32B 2307/718* (2013.01); *B32B 2432/00* (2013.01); *B32B 2555/00* (2013.01)

(58) Field of Classification Search
 CPC ......... D21H 27/38; D21F 11/002; B32B 3/30; B32B 5/02; B32B 5/06; B32B 5/08; B32B 5/22; B32B 5/245; B32B 5/26; B32B 29/007; B32B 29/02; B32B 2260/021; B32B 2260/046; B32B 2262/02; B32B 2262/0223; B32B 2262/0253; B32B 2262/0276; B32B 2262/06; B32B 2262/065; B32B 2262/067; B32B 2262/08; B32B 2262/14; B32B 2307/14; B32B 2307/54; B32B 2307/7163; B32B 2307/718; B32B 2432/00; B32B 2555/00; A47L 13/16; A47L 13/17
 See application file for complete search history.

(56) References Cited

U.S. PATENT DOCUMENTS

| | | |
|---|---|---|
| 3,026,231 A | 3/1962 | Chavannes |
| 3,049,469 A | 8/1962 | Davison |
| 3,058,873 A | 10/1962 | Keim et al. |
| 3,066,066 A | 11/1962 | Keim et al. |
| 3,097,994 A | 7/1963 | Dickens et al. |
| 3,125,552 A | 3/1964 | Loshaek et al. |
| 3,143,150 A | 8/1964 | Buchanan |
| 3,186,900 A | 6/1965 | Young |
| 3,197,427 A | 7/1965 | Schmalz |
| 3,224,986 A | 12/1965 | Butler et al. |
| 3,224,990 A | 12/1965 | Babcock |
| 3,227,615 A | 1/1966 | Korden |
| 3,227,671 A | 1/1966 | Keim |
| 3,239,491 A | 3/1966 | Tsou et al. |
| 3,240,664 A | 3/1966 | Earle, Jr. |
| 3,240,761 A | 3/1966 | Keim et al. |
| 3,248,280 A | 4/1966 | Hyland, Jr. |
| 3,250,664 A | 5/1966 | Conte et al. |
| 3,252,181 A | 5/1966 | Hureau |
| 3,301,746 A | 1/1967 | Sanford et al. |
| 3,311,594 A | 3/1967 | Earle, Jr. |
| 3,329,657 A | 7/1967 | Strazdins et al. |
| 3,332,834 A | 7/1967 | Reynolds, Jr. |
| 3,332,901 A | 7/1967 | Keim |
| 3,352,833 A | 11/1967 | Earle, Jr. |
| 3,384,692 A | 5/1968 | Galt et al. |
| 3,414,459 A | 12/1968 | Wells |
| 3,442,754 A | 5/1969 | Espy |
| 3,459,697 A | 8/1969 | Goldberg et al. |
| 3,473,576 A | 10/1969 | Amneus |
| 3,483,077 A | 12/1969 | Aldrich |
| 3,545,165 A | 12/1970 | Greenwell |
| 3,556,932 A | 1/1971 | Coscia et al. |
| 3,573,164 A | 3/1971 | Friedberg et al. |
| 3,609,126 A | 9/1971 | Asao et al. |
| 3,666,609 A | 5/1972 | Kalwaites et al. |
| 3,672,949 A | 6/1972 | Brown |
| 3,672,950 A | 6/1972 | Murphy et al. |
| 3,773,290 A | 11/1973 | Mowery |
| 3,778,339 A | 12/1973 | Williams et al. |
| 3,813,362 A | 5/1974 | Coscia et al. |
| 3,855,158 A | 12/1974 | Petrovich et al. |
| 3,877,510 A | 4/1975 | Tegtmeier et al. |
| 3,905,863 A | 9/1975 | Ayers |
| 3,911,173 A | 10/1975 | Sprague, Jr. |
| 3,974,025 A | 8/1976 | Ayers |
| 3,994,771 A | 11/1976 | Morgan, Jr. et al. |
| 3,998,690 A | 12/1976 | Lyness et al. |
| 4,038,008 A | 7/1977 | Larsen |
| 4,075,382 A | 2/1978 | Chapman et al. |
| 4,088,528 A | 5/1978 | Berger et al. |
| 4,098,632 A | 7/1978 | Sprague, Jr. |
| 4,102,737 A | 7/1978 | Morton |
| 4,117,187 A | 9/1978 | Adams et al. |
| 4,129,528 A | 12/1978 | Petrovich et al. |
| 4,147,586 A | 4/1979 | Petrovich et al. |
| 4,161,195 A | 7/1979 | Khan |
| 4,184,519 A | 1/1980 | McDonald et al. |
| 4,190,692 A | 2/1980 | Larsen |
| 4,191,609 A | 3/1980 | Trokhan |
| 4,252,761 A | 2/1981 | Schoggen et al. |
| 4,320,162 A | 3/1982 | Schulz |
| 4,331,510 A | 5/1982 | Wells |
| 4,382,987 A | 5/1983 | Smart |
| 4,440,597 A | 4/1984 | Wells et al. |
| 4,501,862 A | 2/1985 | Keim |
| 4,507,351 A | 3/1985 | Johnson et al. |
| 4,514,345 A | 4/1985 | Johnson et al. |
| 4,515,657 A | 5/1985 | Maslanka |
| 4,528,239 A | 7/1985 | Trokhan |
| 4,529,480 A | 7/1985 | Trokhan |
| 4,537,657 A | 8/1985 | Keim |
| 4,545,857 A | 10/1985 | Wells |
| 4,637,859 A | 1/1987 | Trokhan |
| 4,678,590 A | 7/1987 | Nakamura et al. |

(56) References Cited

U.S. PATENT DOCUMENTS

| | | |
|---|---|---|
| 4,714,736 A | 12/1987 | Juhl et al. |
| 4,770,920 A | 9/1988 | Larsonneur |
| 4,780,357 A | 10/1988 | Akao |
| 4,808,467 A | 2/1989 | Suskind et al. |
| 4,836,894 A | 6/1989 | Chance et al. |
| 4,849,054 A | 7/1989 | Klowak |
| 4,885,202 A | 12/1989 | Lloyd et al. |
| 4,891,249 A | 1/1990 | McIntyre |
| 4,909,284 A | 3/1990 | Kositake |
| 4,949,668 A | 8/1990 | Heindel et al. |
| 4,949,688 A | 8/1990 | Bayless |
| 4,983,256 A | 1/1991 | Combette et al. |
| 4,996,091 A | 2/1991 | McIntyre |
| 5,059,282 A | 10/1991 | Ampulski et al. |
| 5,143,776 A | 9/1992 | Givens |
| 5,149,401 A | 9/1992 | Langevin et al. |
| 5,152,874 A | 10/1992 | Keller |
| 5,211,813 A | 5/1993 | Sawley et al. |
| 5,239,047 A | 8/1993 | Devore et al. |
| 5,279,098 A | 1/1994 | Fukuda |
| 5,281,306 A | 1/1994 | Kakiuchi et al. |
| 5,334,289 A | 8/1994 | Trokhan et al. |
| 5,347,795 A | 9/1994 | Fukuda |
| 5,397,435 A | 3/1995 | Ostendorf et al. |
| 5,399,412 A | 3/1995 | Sudall et al. |
| 5,405,501 A | 4/1995 | Phan et al. |
| 5,409,572 A | 4/1995 | Kershaw et al. |
| 5,429,686 A | 7/1995 | Chiu et al. |
| 5,439,559 A | 8/1995 | Crouse |
| 5,447,012 A | 9/1995 | Kovacs et al. |
| 5,470,436 A | 11/1995 | Wagle et al. |
| 5,487,313 A | 1/1996 | Johnson |
| 5,509,913 A | 4/1996 | Yeo |
| 5,510,002 A | 4/1996 | Hermans et al. |
| 5,529,665 A | 6/1996 | Kaun |
| 5,581,906 A | 12/1996 | Ensign et al. |
| 5,591,147 A | 1/1997 | Couture-Dorschner et al. |
| 5,607,551 A | 3/1997 | Farrington, Jr. et al. |
| 5,611,890 A | 3/1997 | Vinson et al. |
| 5,628,876 A | 5/1997 | Ayers et al. |
| 5,635,028 A | 6/1997 | Vinson et al. |
| 5,649,916 A | 7/1997 | Dipalma et al. |
| 5,671,897 A | 9/1997 | Ogg et al. |
| 5,672,248 A | 9/1997 | Wendt et al. |
| 5,679,222 A | 10/1997 | Rasch et al. |
| 5,685,428 A | 11/1997 | Herbers et al. |
| 5,728,268 A | 3/1998 | Weisman et al. |
| 5,746,887 A | 5/1998 | Wendt et al. |
| 5,753,067 A | 5/1998 | Fukuda et al. |
| 5,772,845 A | 6/1998 | Farrington, Jr. et al. |
| 5,806,569 A | 9/1998 | Gulya et al. |
| 5,827,384 A | 10/1998 | Canfield et al. |
| 5,832,962 A | 11/1998 | Kaufman et al. |
| 5,846,380 A | 12/1998 | Van Phan et al. |
| 5,855,738 A | 1/1999 | Weisman et al. |
| 5,858,554 A | 1/1999 | Neal et al. |
| 5,865,396 A | 2/1999 | Ogg et al. |
| 5,865,950 A | 2/1999 | Vinson et al. |
| 5,893,965 A | 4/1999 | Trokhan et al. |
| 5,913,765 A | 6/1999 | Burgess et al. |
| 5,942,085 A | 8/1999 | Neal et al. |
| 5,944,954 A | 8/1999 | Vinson et al. |
| 5,948,210 A | 9/1999 | Huston |
| 5,980,691 A | 11/1999 | Weisman et al. |
| 6,036,139 A | 3/2000 | Ogg |
| 6,039,838 A | 3/2000 | Kaufman et al. |
| 6,048,938 A | 4/2000 | Neal et al. |
| 6,060,149 A | 5/2000 | Nissing et al. |
| 6,106,670 A | 8/2000 | Weisman et al. |
| 6,149,769 A | 11/2000 | Mohammadi et al. |
| 6,162,327 A | 12/2000 | Batra et al. |
| 6,162,329 A | 12/2000 | Vinson et al. |
| 6,187,138 B1 | 2/2001 | Neal et al. |
| 6,200,419 B1 | 3/2001 | Phan |
| 6,203,667 B1 | 3/2001 | Huhtelin |
| 6,207,734 B1 | 3/2001 | Vinson et al. |
| 6,231,723 B1 | 5/2001 | Kanitz et al. |
| 6,287,426 B1 | 9/2001 | Edwards et al. |
| 6,303,233 B1 | 10/2001 | Amon et al. |
| 6,319,362 B1 | 11/2001 | Huhtelin et al. |
| 6,344,111 B1 | 2/2002 | Wilhelm |
| 6,420,013 B1 | 7/2002 | Vinson et al. |
| 6,420,100 B1 | 7/2002 | Trokhan et al. |
| 6,423,184 B2 | 7/2002 | Vahatalo et al. |
| 6,458,246 B1 | 10/2002 | Kanitz et al. |
| 6,464,831 B1 | 10/2002 | Trokhan et al. |
| 6,473,670 B1 | 10/2002 | Huhtelin |
| 6,521,089 B1 | 2/2003 | Griech et al. |
| 6,537,407 B1 | 3/2003 | Law et al. |
| 6,547,928 B2 | 4/2003 | Barnholtz et al. |
| 6,551,453 B2 | 4/2003 | Weisman et al. |
| 6,551,691 B1 | 4/2003 | Hoeft et al. |
| 6,572,722 B1 | 6/2003 | Pratt |
| 6,579,416 B1 | 6/2003 | Vinson et al. |
| 6,602,454 B2 | 8/2003 | McGuire et al. |
| 6,607,637 B1 | 8/2003 | Vinson et al. |
| 6,610,173 B1 | 8/2003 | Lindsay et al. |
| 6,613,194 B2 | 9/2003 | Kanitz et al. |
| 6,660,362 B1 | 12/2003 | Lindsay et al. |
| 6,673,202 B2 | 1/2004 | Burazin et al. |
| 6,701,637 B2 | 3/2004 | Lindsay et al. |
| 6,755,939 B2 | 6/2004 | Vinson et al. |
| 6,773,647 B2 | 8/2004 | McGuire et al. |
| 6,797,117 B1 | 9/2004 | McKay et al. |
| 6,808,599 B2 | 10/2004 | Burazin et al. |
| 6,821,386 B2 | 11/2004 | Weisman et al. |
| 6,821,391 B2 | 11/2004 | Scherb et al. |
| 6,827,818 B2 | 12/2004 | Farrington, Jr. et al. |
| 6,863,777 B2 | 3/2005 | Kanitz et al. |
| 6,896,767 B2 | 5/2005 | Wilhelm |
| 6,939,443 B2 | 9/2005 | Ryan et al. |
| 6,998,017 B2 | 2/2006 | Lindsay et al. |
| 6,998,024 B2 | 2/2006 | Burazin et al. |
| 7,005,043 B2 | 2/2006 | Toney et al. |
| 7,014,735 B2 | 3/2006 | Kramer et al. |
| 7,105,465 B2 | 9/2006 | Patel et al. |
| 7,155,876 B2 | 1/2007 | VanderTuin et al. |
| 7,157,389 B2 | 1/2007 | Branham et al. |
| 7,182,837 B2 | 2/2007 | Chen et al. |
| 7,194,788 B2 | 3/2007 | Clark et al. |
| 7,235,156 B2 | 6/2007 | Baggot |
| 7,269,929 B2 | 9/2007 | VanderTuin et al. |
| 7,294,230 B2 | 11/2007 | Flugge-Berendes et al. |
| 7,311,853 B2 | 12/2007 | Vinson et al. |
| 7,328,550 B2 | 2/2008 | Floding et al. |
| 7,339,378 B2 | 3/2008 | Han et al. |
| 7,351,307 B2 | 4/2008 | Scherb et al. |
| 7,387,706 B2 | 6/2008 | Herman et al. |
| 7,399,378 B2 | 7/2008 | Edwards et al. |
| 7,419,569 B2 | 9/2008 | Hermans et al. |
| 7,427,434 B2 | 9/2008 | Busam et al. |
| 7,431,801 B2 | 10/2008 | Conn et al. |
| 7,432,309 B2 | 10/2008 | Vinson |
| 7,442,278 B2 | 10/2008 | Murray et al. |
| 7,452,447 B2 | 11/2008 | Duan et al. |
| 7,476,293 B2 | 1/2009 | Herman et al. |
| 7,484,276 B2 | 2/2009 | Jeambar |
| 7,494,563 B2 | 2/2009 | Edwards et al. |
| 7,510,631 B2 | 3/2009 | Scherb et al. |
| 7,513,975 B2 | 4/2009 | Burma |
| 7,563,344 B2 | 7/2009 | Beuther et al. |
| 7,582,187 B2 | 9/2009 | Scherb et al. |
| 7,611,607 B2 | 11/2009 | Mullally et al. |
| 7,622,020 B2 | 11/2009 | Awofeso et al. |
| 7,662,462 B2 | 2/2010 | Noda et al. |
| 7,670,678 B2 | 3/2010 | Phan |
| 7,683,126 B2 | 3/2010 | Neal et al. |
| 7,686,923 B2 | 3/2010 | Scherb et al. |
| 7,687,140 B2 | 3/2010 | Manifold et al. |
| 7,691,230 B2 | 4/2010 | Scherb et al. |
| 7,732,357 B2 | 6/2010 | Annis |
| 7,744,722 B1 | 6/2010 | Tucker et al. |
| 7,744,726 B2 | 6/2010 | Scherb et al. |
| 7,799,382 B2 | 9/2010 | Payne et al. |

(56) References Cited

U.S. PATENT DOCUMENTS

| | | |
|---|---|---|
| 7,811,418 B2 | 10/2010 | Klerelid et al. |
| 7,815,978 B2 | 10/2010 | Davenport et al. |
| 7,823,366 B2 | 11/2010 | Schoeneck |
| 7,842,163 B2 | 11/2010 | Nickel et al. |
| 7,867,361 B2 | 1/2011 | Salaam et al. |
| 7,871,692 B2 | 1/2011 | Morin et al. |
| 7,887,673 B2 | 2/2011 | Andersson et al. |
| 7,905,989 B2 | 3/2011 | Scherb et al. |
| 7,914,866 B2 | 3/2011 | Shannon et al. |
| 7,931,781 B2 | 4/2011 | Scherb et al. |
| 7,951,269 B2 | 5/2011 | Herman et al. |
| 7,955,549 B2 | 6/2011 | Noda et al. |
| 7,959,764 B2 | 6/2011 | Ringer et al. |
| 7,972,475 B2 | 7/2011 | Chan et al. |
| 7,989,058 B2 | 8/2011 | Manifold et al. |
| 8,034,463 B2 | 10/2011 | Leimbach et al. |
| 8,051,629 B2 | 11/2011 | Pazdernik et al. |
| 8,075,739 B2 | 12/2011 | Scherb et al. |
| 8,092,652 B2 | 1/2012 | Scherb et al. |
| 8,118,979 B2 | 2/2012 | Herman et al. |
| 8,147,649 B1 | 4/2012 | Tucker et al. |
| 8,152,959 B2 | 4/2012 | Elony et al. |
| 8,196,314 B2 | 6/2012 | Munch |
| 8,216,427 B2 | 7/2012 | Klerelid et al. |
| 8,236,135 B2 | 8/2012 | Prodoehl et al. |
| 8,303,773 B2 | 11/2012 | Scherb et al. |
| 8,382,956 B2 | 2/2013 | Boechat et al. |
| 8,402,673 B2 | 3/2013 | Da Silva et al. |
| 8,409,404 B2 | 4/2013 | Harper et al. |
| 8,435,384 B2 | 5/2013 | Da Silva et al. |
| 8,440,055 B2 | 5/2013 | Scherb et al. |
| 8,445,032 B2 | 5/2013 | Topolkaraev et al. |
| 8,454,800 B2 | 6/2013 | Mourad et al. |
| 8,470,133 B2 | 6/2013 | Cunnane et al. |
| 8,506,756 B2 | 8/2013 | Denis et al. |
| 8,544,184 B2 | 10/2013 | Da Silva et al. |
| 8,574,211 B2 | 11/2013 | Morita et al. |
| 8,580,083 B2 | 11/2013 | Boechat et al. |
| 8,728,277 B2 | 5/2014 | Boechat et al. |
| 8,758,569 B2 | 6/2014 | Aberg et al. |
| 8,771,466 B2 | 7/2014 | Denis et al. |
| 8,801,903 B2 | 8/2014 | Mourad et al. |
| 8,815,057 B2 | 8/2014 | Eberhardt et al. |
| 8,822,009 B2 | 9/2014 | Riviere et al. |
| 8,968,517 B2 | 3/2015 | Ramaratnam et al. |
| 8,980,062 B2 | 3/2015 | Karlsson et al. |
| 9,005,710 B2 | 4/2015 | Jones et al. |
| D734,617 S | 7/2015 | Seitzinger et al. |
| 9,095,477 B2 | 8/2015 | Yamaguchi et al. |
| D738,633 S | 9/2015 | Seitzinger et al. |
| 9,382,666 B2 | 7/2016 | Ramaratnam et al. |
| 9,506,203 B2 | 11/2016 | Ramaratnam et al. |
| 9,580,872 B2 | 2/2017 | Ramaratnam et al. |
| 9,702,089 B2 | 7/2017 | Ramaratnam et al. |
| 9,702,090 B2 | 7/2017 | Ramaratnam et al. |
| 9,719,213 B2 | 8/2017 | Miller, IV et al. |
| 9,725,853 B2 | 8/2017 | Ramaratnam et al. |
| 11,391,000 B2 * | 7/2022 | Ramaratnam ............ B32B 5/06 |
| 11,583,489 B2 * | 2/2023 | Miller, IV ................ A61K 8/66 |
| 11,642,868 B2 * | 5/2023 | Monson ............... D21H 27/002 |
| | | 428/292.7 |
| 2001/0018068 A1 | 8/2001 | Lorenzi et al. |
| 2002/0028230 A1 | 3/2002 | Eichhorn et al. |
| 2002/0060049 A1 | 5/2002 | Kanitz et al. |
| 2002/0061386 A1 | 5/2002 | Carson et al. |
| 2002/0098317 A1 | 7/2002 | Jaschinski et al. |
| 2002/0110655 A1 | 8/2002 | Seth |
| 2002/0115194 A1 | 8/2002 | Lange et al. |
| 2002/0125606 A1 | 9/2002 | McGuire et al. |
| 2002/0166646 A1 | 11/2002 | Drew |
| 2003/0024674 A1 | 2/2003 | Kanitz et al. |
| 2003/0056911 A1 | 3/2003 | Hermans et al. |
| 2003/0056917 A1 | 3/2003 | Jimenez |
| 2003/0070781 A1 | 4/2003 | Hermans et al. |
| 2003/0114071 A1 | 6/2003 | Everhart et al. |
| 2003/0159401 A1 | 8/2003 | Sorensson et al. |
| 2003/0188843 A1 | 10/2003 | Kanitz et al. |
| 2003/0218274 A1 | 11/2003 | Boutilier et al. |
| 2004/0013859 A1 | 1/2004 | Annis |
| 2004/0118531 A1 | 6/2004 | Shannon et al. |
| 2004/0123963 A1 | 7/2004 | Chen et al. |
| 2004/0126601 A1 | 7/2004 | Kramer et al. |
| 2004/0126710 A1 | 7/2004 | Hill et al. |
| 2004/0168784 A1 | 9/2004 | Duan et al. |
| 2004/0173333 A1 | 9/2004 | Hermans et al. |
| 2004/0234804 A1 | 11/2004 | Liu et al. |
| 2005/0016704 A1 | 1/2005 | Huhtelin |
| 2005/0069679 A1 | 3/2005 | Stelljes et al. |
| 2005/0069680 A1 | 3/2005 | Stelljes et al. |
| 2005/0098281 A1 | 5/2005 | Schulz et al. |
| 2005/0112115 A1 | 5/2005 | Khan |
| 2005/0123726 A1 | 6/2005 | Broering et al. |
| 2005/0130536 A1 | 6/2005 | Siebers et al. |
| 2005/0136222 A1 | 6/2005 | Hada et al. |
| 2005/0148257 A1 | 7/2005 | Hermans et al. |
| 2005/0150626 A1 | 7/2005 | Kanitz et al. |
| 2005/0166551 A1 | 8/2005 | Keane et al. |
| 2005/0241786 A1 | 11/2005 | Edwards et al. |
| 2005/0241788 A1 | 11/2005 | Baggot et al. |
| 2005/0252626 A1 | 11/2005 | Chen et al. |
| 2005/0280184 A1 | 12/2005 | Sayers et al. |
| 2005/0287340 A1 | 12/2005 | Morelli et al. |
| 2006/0005916 A1 | 1/2006 | Stelljes et al. |
| 2006/0013998 A1 | 1/2006 | Stelljes et al. |
| 2006/0019567 A1 | 1/2006 | Sayers |
| 2006/0083899 A1 | 4/2006 | Burazin et al. |
| 2006/0090867 A1 | 5/2006 | Herman et al. |
| 2006/0093788 A1 | 5/2006 | Behm et al. |
| 2006/0113049 A1 | 6/2006 | Knobloch et al. |
| 2006/0130986 A1 | 6/2006 | Flugge-Berendes et al. |
| 2006/0194022 A1 | 8/2006 | Boutilier et al. |
| 2006/0269706 A1 | 11/2006 | Shannon et al. |
| 2007/0020315 A1 | 1/2007 | Shannon et al. |
| 2007/0131366 A1 | 6/2007 | Underhill et al. |
| 2007/0137813 A1 | 6/2007 | Nickel et al. |
| 2007/0137814 A1 | 6/2007 | Gao |
| 2007/0170610 A1 | 7/2007 | Payne et al. |
| 2007/0240842 A1 | 10/2007 | Scherb et al. |
| 2007/0251659 A1 | 11/2007 | Fernandes et al. |
| 2007/0251660 A1 | 11/2007 | Walkenhaus et al. |
| 2007/0267157 A1 | 11/2007 | Kanitz et al. |
| 2007/0272381 A1 | 11/2007 | Elony et al. |
| 2007/0275866 A1 | 11/2007 | Dykstra |
| 2007/0298221 A1 | 12/2007 | Vinson |
| 2008/0035289 A1 | 2/2008 | Edwards et al. |
| 2008/0076695 A1 | 3/2008 | Uitenbroek et al. |
| 2008/0156450 A1 | 7/2008 | Klerelid et al. |
| 2008/0199655 A1 | 8/2008 | Monnerie et al. |
| 2008/0245498 A1 | 10/2008 | Ostendorf et al. |
| 2008/0302493 A1 | 12/2008 | Boatman et al. |
| 2008/0308247 A1 | 12/2008 | Ringer et al. |
| 2009/0020248 A1 | 1/2009 | Sumnicht et al. |
| 2009/0056892 A1 | 3/2009 | Rekoske |
| 2009/0061709 A1 | 3/2009 | Nakai et al. |
| 2009/0104430 A1 | 4/2009 | Cordial |
| 2009/0205797 A1 | 8/2009 | Fernandes et al. |
| 2009/0218056 A1 | 9/2009 | Manifold et al. |
| 2010/0065234 A1 | 3/2010 | Klerelid et al. |
| 2010/0119779 A1 | 5/2010 | Ostendorf et al. |
| 2010/0224338 A1 | 9/2010 | Harper et al. |
| 2010/0230064 A1 | 9/2010 | Eagles et al. |
| 2010/0236034 A1 | 9/2010 | Eagles et al. |
| 2010/0239825 A1 | 9/2010 | Sheehan et al. |
| 2010/0272965 A1 | 10/2010 | Schinkoreit et al. |
| 2011/0027545 A1 | 2/2011 | Harlacher et al. |
| 2011/0180223 A1 | 7/2011 | Klerelid et al. |
| 2011/0189435 A1 | 8/2011 | Manifold et al. |
| 2011/0189442 A1 | 8/2011 | Manifold et al. |
| 2011/0206913 A1 | 8/2011 | Manifold et al. |
| 2011/0223381 A1 | 9/2011 | Sauter et al. |
| 2011/0253329 A1 | 10/2011 | Manifold et al. |
| 2011/0265967 A1 | 11/2011 | Van Phan |
| 2011/0303379 A1 | 12/2011 | Boechat et al. |
| 2012/0144611 A1 | 6/2012 | Baker et al. |

(56) References Cited

U.S. PATENT DOCUMENTS

| | | |
|---|---|---|
| 2012/0152475 A1 | 6/2012 | Edwards et al. |
| 2012/0177888 A1 | 7/2012 | Escafere et al. |
| 2012/0244241 A1 | 9/2012 | McNeil |
| 2012/0267063 A1 | 10/2012 | Klerelid et al. |
| 2012/0297560 A1 | 11/2012 | Zwick et al. |
| 2013/0008135 A1 | 1/2013 | Moore et al. |
| 2013/0029105 A1 | 1/2013 | Miller et al. |
| 2013/0029106 A1 | 1/2013 | Lee et al. |
| 2013/0133851 A1 | 5/2013 | Boechat et al. |
| 2013/0150817 A1 | 6/2013 | Kainth et al. |
| 2013/0160960 A1 | 6/2013 | Hermans et al. |
| 2013/0209749 A1 | 8/2013 | Myangiro et al. |
| 2013/0248129 A1 | 9/2013 | Manifold et al. |
| 2013/0327487 A1 | 12/2013 | Espinosa et al. |
| 2014/0004307 A1 | 1/2014 | Sheehan |
| 2014/0041820 A1 | 2/2014 | Ramaratnam et al. |
| 2014/0041822 A1 | 2/2014 | Boechat et al. |
| 2014/0050890 A1 | 2/2014 | Zwick et al. |
| 2014/0053994 A1 | 2/2014 | Manifold et al. |
| 2014/0096924 A1 | 4/2014 | Rekokske et al. |
| 2014/0182798 A1 | 7/2014 | Polat et al. |
| 2014/0242320 A1 | 8/2014 | McNeil et al. |
| 2014/0272269 A1 | 9/2014 | Hansen |
| 2014/0272747 A1 | 9/2014 | Ciurkot |
| 2014/0284237 A1 | 9/2014 | Gosset |
| 2014/0360519 A1 | 12/2014 | George et al. |
| 2015/0059995 A1 | 3/2015 | Ramaratnam et al. |
| 2015/0102526 A1 | 4/2015 | Ward et al. |
| 2015/0129145 A1 | 5/2015 | Chou et al. |
| 2015/0211179 A1 | 7/2015 | Alias et al. |
| 2015/0241788 A1 | 8/2015 | Yamaguchi |
| 2015/0330029 A1* | 11/2015 | Ramaratnam ........... B32B 29/02 162/111 |
| 2016/0060811 A1 | 3/2016 | Riding et al. |
| 2016/0090692 A1 | 3/2016 | Eagles et al. |
| 2016/0090693 A1 | 3/2016 | Eagles et al. |
| 2016/0130762 A1 | 5/2016 | Ramaratnam et al. |
| 2016/0145810 A1 | 5/2016 | Miller, IV et al. |
| 2016/0159007 A1 | 6/2016 | Miller, IV et al. |
| 2016/0160448 A1 | 6/2016 | Miller, IV et al. |
| 2016/0185041 A1 | 6/2016 | Topolkaraev et al. |
| 2016/0185050 A1 | 6/2016 | Topolkaraev et al. |
| 2016/0273168 A1 | 9/2016 | Ramaratnam et al. |
| 2016/0273169 A1 | 9/2016 | Ramaratnam et al. |
| 2016/0289897 A1 | 10/2016 | Ramaratnam et al. |
| 2016/0289898 A1 | 10/2016 | Ramaratnam et al. |
| 2017/0044717 A1 | 2/2017 | Quigley |
| 2017/0101741 A1 | 4/2017 | Sealey et al. |
| 2017/0167082 A1 | 6/2017 | Ramaratnam et al. |
| 2017/0226698 A1 | 8/2017 | LeBrun et al. |
| 2017/0233946 A1 | 8/2017 | Sealey et al. |
| 2017/0253422 A1 | 9/2017 | Anklam et al. |
| 2017/0268178 A1 | 9/2017 | Ramaratnam et al. |
| 2018/0140529 A1* | 5/2018 | Miller, IV ................. A61K 8/88 |
| 2022/0316142 A1* | 10/2022 | Ramaratnam ............ B32B 5/06 |
| 2022/0378685 A1* | 12/2022 | Miller, IV ............ D21H 27/007 |
| 2023/0234330 A1* | 7/2023 | Monson ..................... B32B 5/26 428/292.7 |
| 2023/0366155 A1* | 11/2023 | Zwick .................... D21H 27/38 |

FOREIGN PATENT DOCUMENTS

| | | |
|---|---|---|
| CN | 1138356 A | 12/1996 |
| CN | 1207149 A | 2/1999 |
| CN | 1244899 A | 2/2000 |
| CN | 1268559 A | 10/2000 |
| CN | 1377405 A | 10/2002 |
| CN | 2728254 Y | 9/2005 |
| DE | 4242539 A1 | 8/1993 |
| EP | 0097036 A2 | 12/1983 |
| EP | 0496524 A1 | 7/1992 |
| EP | 0979895 A1 | 2/2000 |
| EP | 1911574 A1 | 1/2007 |
| EP | 1339915 B1 | 7/2007 |
| EP | 2123826 A2 | 5/2009 |
| GB | 946093 A | 1/1964 |
| JP | 2013208298 A | 10/2013 |
| JP | 2014213138 A | 11/2014 |
| WO | 96/06223 A1 | 2/1996 |
| WO | 9922059 A1 | 5/1999 |
| WO | 200382550 A2 | 10/2003 |
| WO | 200445834 A1 | 6/2004 |
| WO | 2007070145 A1 | 6/2007 |
| WO | 2008019702 A1 | 2/2008 |
| WO | 2009006709 A1 | 1/2009 |
| WO | 2009/061079 A1 | 5/2009 |
| WO | 2009067079 A1 | 5/2009 |
| WO | 2011028823 A1 | 3/2011 |
| WO | 2012003360 | 1/2012 |
| WO | 2013024297 A1 | 2/2013 |
| WO | 2013136471 A1 | 9/2013 |
| WO | 2014/022848 A1 | 2/2014 |
| WO | 201500755 A1 | 1/2015 |
| WO | 2015/176063 A1 | 11/2015 |
| WO | 2016/077594 A1 | 5/2016 |
| WO | 2016/086019 A1 | 6/2016 |
| WO | 2016/090242 A1 | 6/2016 |
| WO | 2016/090364 A1 | 6/2016 |
| WO | 2016085704 A1 | 6/2016 |
| WO | 2017066465 A1 | 4/2017 |
| WO | 2017066656 A1 | 4/2017 |
| WO | 2017139786 A1 | 8/2017 |
| WO | WO-2018093635 A1 * | 5/2018 ............ A61K 8/0208 |

OTHER PUBLICATIONS

International Preliminary Report on Patentability of PCT/US2013/053593 dated Feb. 3, 2015.
Supplementary European Search Report of EP 13 82 6461 dated Apr. 1, 2016.
International Search Report of PCT/US15/031411 dated Aug. 13, 2015.
Written Opinion of PCT/US15/031411 dated Aug. 13, 2015.
International Search Report for PCT/US16/56871 dated Jan. 12, 2017.
Written Opinion of International Searching Authority for PCT/US16/56871 dated Jan. 12, 2017.
International Search Report for PCT/US2016/057163 dated Dec. 23, 2016.
Written Opinion of International Searching Authority for PCT/US2016/057163 dated Dec. 23, 2016.
International Search Report for PCT/US2017/029890 dated Jul. 14, 2017.
Written Opinion of International Searching Authority for PCT/US2017/029890 dated Jul. 14, 2017.
International Search Report for PCT/US2017/032746 dated Aug. 7, 2017.
Written Opinion of International Searching Authority for PCT/US2017/032746 dated Aug. 7, 2017.
International Search Report for PCT/US17/17705 dated Jun. 9, 2017.
Written Opinion of International Searching Authority for PCT/US17/17705 dated Jun. 9, 2017.
Written Opinion of International Searching Authority for PCT/US15/62483 dated May 6, 2016.
International Search Report for PCT/US15/63986 dated Mar. 29, 2016.
Written Opinion of International Searching Authority for PCT/US15/63986 dated Mar. 29, 2016.
International Search Report for PCT/US15/64284 dated Feb. 11, 2016.
Written Opinion of International Searching Authority for PCT/US15/64284 dated Feb. 11, 2016.
International Search Report for PCT/US13/53593 dated Dec. 30, 2013.
Written Opinion of International Searching Authority for PCT/US13/53593 dated Dec. 30, 2013.

(56) References Cited

OTHER PUBLICATIONS

International Search Report for PCT/US15/60398 dated Jan. 29, 2016.
Written Opinion of International Searching Authority for PCT/US15/60398 dated Jan. 29, 2016.
International Search Report for PCT/US15/62483 dated May 6, 2016.

* cited by examiner

FLUSHABLE WIPE AND METHOD OF FORMING THE SAME

RELATED APPLICATIONS

This application is a divisional of and claims priority to and the benefit of U.S. patent application Ser. No. 14/715,350, filed May 18, 2015 and entitled FLUSHABLE WIPE AND METHOD OF FORMING THE SAME, now U.S. Pat. No. 11,391,000, which in term claims priority to and the benefit of U.S. Provisional Application No. 61/994,563, filed May 16, 2014 and entitled FLUSHABLE WIPE AND METHOD OF FORMING THE SAME, the contents of which are incorporated herein by reference in their entirety.

FIELD OF THE INVENTION

The present invention is directed to wipes, and in particular to wipes having one or more multi-layer plies, such as disposable, hygienic wipes.

BACKGROUND

In recent years, a growing number of people have begun to use value added consumer disposable items like facial cleaning wipes, moist towelettes, personal hygiene wipes, and time-saving products like household cleaning wipes. The market for wipes is forecast to rise significantly in the coming years.

Once dominated by baby care, the wipes market has branched out into applications targeted for specific uses like personal hygiene and household cleansing. Personal care wipes currently represent approximately 60% of the North American market for wipes and is inclusive of baby wipes, various targeted personal hygiene cleansing wipes (hands, face, wounds, flushable adult wipes), feminine hygiene, and adult incontinence. Household wipes currently represent approximately 25% of the market and are inclusive of targeted cleansing wipes for the kitchen, bathroom, windows, and even automobiles. Industrial wipes represent the remaining approximately 15% of the market and are used for industrial equipment cleaning.

A key consumer demand is for greener or more eco-friendly wipe products. This necessitates developing biodegradable products with minimal environmental footprint through all levels of the supply chain, including raw materials, packaging, transportation, and overall manufacturing operations.

"Flushability" has become a critical issue for wipes manufacturers as well. Wastewater treatment facilities have been focusing their attention on wipes as they are clogging piping and pumps at the treatment plants. INDA has been working with wipes manufacturers, wastewater treatment facilities and local government officials to address this growing issue.

Utilization of the appropriate technology and fiber sources to create wipe products that are low cost, eco-friendly, and of high quality are therefore mandatory for success in today's marketplace.

Currently available flushable wipe products are not truly flushable because they do not disperse well in all conditions that wipes encounter in the household toilet/septic systems. Most of these products are size-based flushable wipes and pass through plumbing systems without breaking down into smaller pieces or fiber clusters. As a result, even though they pass through the piping systems immediately after flushing, they often plug up the sewage systems and the effluent clarifier's controlled by the city/municipal systems. In addition, the fibers used in the manufacture of these types of products are not all natural fibers. Almost every flushable product available has a significant amount of synthetic fibers, such as polyethylene, polypropylene, or polyester, in the form of single component or bicomponent fibers. Almost all products that are claimed as flushable wipes may pass the INDA flushability guidelines but are not truly flushable because they do not disperse adequately to pass through smaller pipes and other types of restrictions in sewage treatment systems.

SUMMARY OF THE INVENTION

An object of the present invention is to provide a true flushable wipe that disintegrates when flushed and does not plug up city/municipal sewage systems (i.e., the wipe is septic safe).

Another object of the present invention is to provide a flushable wipe that is biodegradable.

Another object of the present invention is to provide a flushable wipe that includes a binder that allows the wipe to be pre-moistened without losing its functional strength properties.

A flushable wipe according to an exemplary embodiment of the present invention is a three layer wipe having external layers and an internal, core layer. The external layers are composed primarily of natural fibers, and in an exemplary embodiment the external layers are made up of 50% to 100% by weight natural fibers. The core layer is composed of a foam-formed fiber blend of natural fibers and long synthetic fibers. The synthetic fibers are non-thermoplastic fibers. In an exemplary embodiment, the core layer is made up of 25% to 75% by weight natural fibers and 1% to 75% by weight long synthetic fibers. The basis weight of the wipe is within the range of 20 gsm to 100 gsm.

A flushable wipe according to another exemplary embodiment of the present invention has more than four layers, with each layer containing a mixture of cellulosic fiber and bi-component fibers. The flushable wipe may contain water soluble binders with a trigger component. This trigger component is a controlled concentration of salt in the wetting solution that insolubilizes the binder and allows it to function as an adhesive for the substrate. When the controlled concentration of salt is diluted, the binder becomes soluble and starts to drop strength below a critical level.

A flushable wipe according to another exemplary embodiment of the present invention has two layers, where the first layer is spun or melt blown with the forming wire stretched and de-stretched during the production process to give the substrate some stretch. The second layer is foam formed and the fibers are much smaller than the first layer and the two layers are plied via hydroentangling.

In embodiments, the flushable wipe of the present invention may be single ply. In other embodiments, the flushable wipe may comprise two or more plies.

The present invention also encompasses a method of manufacturing such flushable wipes and an apparatus for manufacturing such flushable wipes.

In embodiments, a multi-ply flushable wipe comprises two or more plies with at least one of the two or more plies comprising first and second exterior layers and a foam-formed middle layer disposed between the first and second exterior layers. Each of the exterior layers comprises at least 50% by weight natural fibers. The middle layer comprises synthetic fibers and at least 25% by weight natural fibers, the synthetic fibers having a length within the range of 1 mm and 20 mm. In embodiments, at least one of the first and second exterior layers is also foam formed. The at least one other ply of the wipe may be substantially identical in structure to the at least one ply.

The natural fibers of the multi-ply flushable wipe may comprise fibers of the type selected from the group consisting of: softwood fibers, hardwood fibers, elephant grass, nettle, buntal, buri, soybean protein, milvet milk, abaca, bagasse, bamboo, coir, cotton, flax, linen, hemp, jute, kapok, kenaf, pina, raffia, ramie, sisal, oxidized natural fibers and combinations thereof. The natural fibers may be or may include alternate natural fibers of the type selected from the group consisting of: abaca, bamboo, coir, flax, linen, kapok, pina, raffia, ramie, sisal, nettle, buntal, buri, cotton, kenaf, elephant grass, jute, hemp, bagasse fibers and combinations thereof. The synthetic fibers, which may be or may include semi-synthetic fibers, may comprise fibers of the type selected from the group consisting of: acrylic, aramid, para-aramid, meta-aramid, modacrylic, nylon, olefin, polyester, polyethylene, ultra-high molecular weight polyethylene, polyester-polyurethane copolymer, polyvinyl alcohol, polyvinyl chloride, poly(p-phenylene-2,6-benzobisoxazole), polypropylene, ethylene vinyl alcohol and combinations thereof, and/or may comprise semisynthetic fibers of the type selected from the group consisting of: regenerated cellulose, rayon, lyocell, polylactic acid, polyvinyl alcohol and combinations thereof. The synthetic fibers of the flushable wipe are generally non-thermoplastic. An average fiber length of the multi-ply flushable wipe is less than 5 mm.

The multi-ply flushable wipe has at least one of the following properties: a porosity below 40 cfm, a basis weight below 90 gsm, a machine direction tensile strength within the range of 30 N/m to 250 N/m, or preferably a machine direction tensile strength within the range of 50 N/m to 150 N/m, a cross direction tensile strength within the range of 30 N/m to 250 N/m, or preferably a cross direction tensile strength within the range of 50 N/m to 150 N/m, and a thickness within the range of 300 to 1500 microns, preferably a thickness within the range of 400 to 1250 microns.

At least one ply of the multi-ply flushable wipe may be comprised of one or more of the following combinations: a combination of softwood fibers and alternate natural fibers; a combination of softwood fibers and modified rayon fibers; a combination of softwood fibers and renewable polymeric fibers; a combination of softwood fibers and water based polyvinyl alcohol (PVA) fibers; a combination of softwood fibers, renewable polymeric fibers and polyvinyl alcohol (PVA) fibers; and a combination of softwood fibers, modified rayon fibers, renewable polymeric fibers, water-based polyvinyl alcohol (PVA) fibers and alternate natural fibers.

In embodiments, at least one ply of the multi-ply flushable wipe comprises rayon fibers at an inclusion rate within the range of 10% to 50% by weight. The modified rayon fibers may have shaped fibers having tri-lobal or star-shaped cross-sections. The modified rayon fibers may be viscose rayon fibers, such as lyocell fibers.

Also, in embodiments, at least one ply of the multi-ply flushable wipe may comprise water-based polyvinyl alcohol (PVA) fibers at an inclusion rate of 10% to 50% by weight. The water-based polyvinyl alcohol (PVA) fibers are shaped fibers may be tri-lobal or star-shaped cross-sections.

In embodiments, at least one ply of the multi-ply flushable wipe may comprise polylactic acid (PLA) fibers at an inclusion rate of 1% to 25% by weight. The polylactic acid (PLA) fibers are shaped fibers may have tri-lobal or star-shaped cross-sections.

A slurry from which the multi-ply flushable wipe is formed may comprise additives, enzymes, and/or fillers. The additives may comprise additives of the type selected from the group consisting of: urea formaldehyde, melamine formaldehyde, poly amide poly amine epichlorohydrin, polyethlyenimine, starch, starch derivatives, aldehyde functionalized starches, chitosan, aldehyde functionalize polyacrylamides, glyoxalated polyacrylamide, glyoxalated copolymer, carboxyl methyl cellulose, polyvinyl alcohol, polyvinyl acetate, polyvinyl amine, polyamide resins, polyacrylamide resins, galactomannan gums, acrylic emulsions, styrene-butadiene latexes, vinyl acetate polymers, ethylene-vinyl acetate copolymers, vinyl chloride polymers, vinylidene chloride polymers, vinyl chloride-vinylidene copolymers, acrylo-nitrile copolymers, ethylene-acrylic copolymers, latex emulsions, acrolein copolymers and combinations thereof. The enzyme may comprise, for example, oxidoreductase enzymatic systems. The fillers may comprise, for example, at least one of calcium carbonate particles, clay particles or talc particles. The multi-ply flushable wipe may also include filler material, such as at least one of super absorbent polymers and encapsulated polymers.

The multi-ply flushable wipe may include a binder between the two or more plies. The binder may be of a type selected from the group consisting of: poly(vinyl) alcohol, poly(vinyl) acetate, poly (ethylene) (vinyl) alcohols, poly (ethylene) (vinyl) acetate, copolymers of vinyl acetate-ethylene, starch based chemistries and combinations thereof. The binder may further comprise a cross-linking agent, ion sensitive polymers, a trigger chemistry, such as boric acid, and/or a trigger salt chemistry, such as sodium chloride. The two or more plies of the wipe may be held together by embossments.

In embodiments, the multi-ply flushable wipe also comprises a cleansing solution and/or a wetting/cleaning solution. A cleansing solution may include glycol based crosslinking chemistry, anhydrides and epoxy groups, cyclodextrins adapted to release fragrances, and/or at least one of aloe or shea butter. The cleansing solution may be present in the amount of 40% to 80% by weight. A wetting/cleaning solution may include purified water and a combination of one or more of the following: humectants, preservatives, moisturizers, surfactants, chelating agents, pH buffer and aromatic compounds.

The resulting multi-ply flushable wipe desirably has a basis weight within the range of 20 gsm to 100 gsm.

In another exemplary embodiment in accordance with the present invention, a multi-ply flushable wipe comprises two or more plies with at least one of the two or more plies comprising first and second exterior layers and a middle layer disposed between the first and second exterior layers. Each of the exterior layers comprises at least 50% by weight natural fibers. In this embodiment, the middle layer comprises synthetic fibers and at least 75% by weight natural fibers, the synthetic fibers having a length within the range of 1 mm and 20 mm. The ply has an average fiber length (LWW) of less than about 4 mm. The wipe has a cross direction wet strength greater than 20 N/m and the wipe is dispersible. In embodiments, at least one of the two or more plies of the wipe comprises greater than 80% pulp fibers. This multi-ply flushable wipe may further a cleansing solution and/or a binder between the two or more plies. The wipe may have at least one of the following properties: a porosity below 40 cfm, a basis weight below 90 gsm, a machine direction tensile strength within the range of 30 N/m to 250 N/m, or preferably a machine direction tensile strength within the range of 50 N/m to 150 N/m, The present invention further comprises a method of forming a multi-ply flushable wipe, that includes forming two or more plies. Each ply is formed by wetlaying first and second exterior layers and a foam formed middle layer so as to form a web, where each of the first and second exterior layers comprises at least 50% by weight natural fibers and the foam-formed middle layer comprises synthetic fibers and at least 25% by weight natural fibers, the synthetic fibers having a length within the range of 1 mm and 20 mm. The web is then imprinted with a structured fabric and dried. The two or more plies are attached together using a binder to form the multi-ply flushable wipe. The drying step may include a through air drying process in which the web is dried on a steam heated cylinder, and may include use of a belt press. The method may further include a step of removing the dried web from the steam heated cylinder, such as by creping or by blowing the dried web off the steam heated cylinder. Additionally, the method may include the step of pre-drying the web after imprinting.

Other features and advantages of embodiments of the invention will become readily apparent from the following detailed description, the accompanying drawings and the appended claims.

BRIEF DESCRIPTION OF THE DRAWINGS

Exemplary embodiments of the present invention will be described with references to the accompanying figures, wherein.

DETAILED DESCRIPTION

The present invention is directed to a flushable and dispersible wipe including a core layer that may be composed of a foam-formed fiber blend of natural fibers (which may be or include alternative natural fibers) and long synthetic fibers (which may be or include semi-synthetic fibers). For the purposes of the present disclosure, the term "long fiber" is intended to mean fibers having a length of at least 1 mm, preferably within the range of 1 mm and 20 mm, more preferably within the range of 3 mm and 15 mm. Also, for the purposes of the present disclosure, the term "flushable" is intended to mean that the wipe is able to be disposed of through sanitation fixtures, such as toilets, without clogging or otherwise interfering with the disposal process. The current measure of flushability is set by the 3rd edition of the INDA/EDANA Flushability Guidelines (Guidance Document for Assessing Flushability of Nonwoven Disposable Products (June 2013)). A wipe is considered "dispersible" if it passes the Slosh Box Disintegration Test set forth in INDA FG502. Unless otherwise specified, for the purposes of the present invention, weight percentages are given relative to the dry weight of the final product (i.e, prior to application of lotions or other post formation additives).

Figure 1:
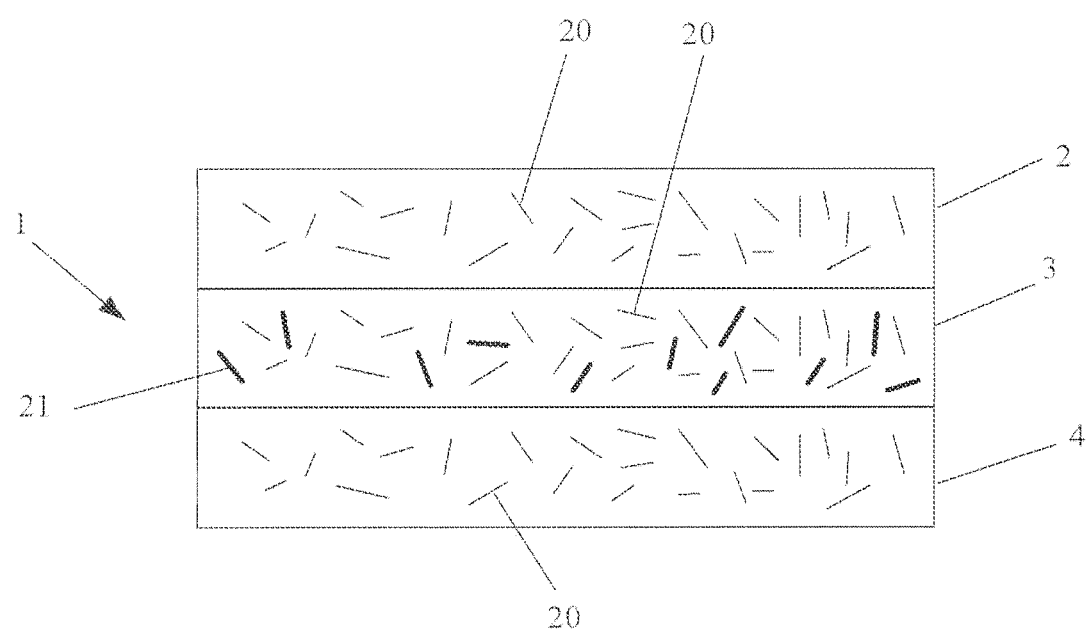
FIG. 1 is a schematic diagram of a three layer ply of a wipe formed by a wet laid process in accordance with an exemplary embodiment of the present invention.

FIG. 1 shows a three layer ply of a wipe, generally designated by reference number 1, according to an exemplary embodiment of the present invention. The wipe 1 has external layers 2 and 4 as well as an internal, core layer 3. External layers 2 and 4 are composed primarily of natural fibers 20, and in an exemplary embodiment the external layers 2 and 4 are made up of 50% to 100% by weight natural fibers. (The remaining fibers can be synthetic or semisynthetic fibers.) In an exemplary embodiment, the external layers 2 and 4 are made up of 90% by weight natural fibers. (The remaining fibers can be synthetic or semisynthetic fibers.) The core layer 3 is composed of water or foam-formed fiber blend of natural fibers 20 and long synthetic fibers 21. The synthetic fibers 21 are non-thermoplastic fibers. In an exemplary embodiment, the core layer 3 is made up of 25% to 75% by weight natural fibers and 1% to 75% by weight long synthetic fibers. (The remaining fibers can be short synthetic or semisynthetic fibers.) In an exemplary embodiment, the core layer 3 is made of 50% by weight natural fibers and 50% by weight long synthetic fibers. The basis weight of the wipe 1 is within the range of 20 gsm to 100 gsm, and in an exemplary embodiment has a basis weight of 50 gsm. The average fiber length of the long synthetic fibers that are used in wipe 1 is, in embodiments, less than 5 mm, and may be more preferably less than 4 mm.

The wipe 1 may be produced using a single layered headbox wherein the above mentioned natural and synthetic fibers, or combinations thereof may be used in the forming section. Alternatively, wipe 1 may be produced using a stratified headbox to form multiple layers simultaneously.

The natural fibers/alternate natural fibers 20 used to form the wipe 1 may be composed of natural cellulose fibers derived from, for example, softwood, hardwood, kenaf, elephant grass, esparto grass, sisal, abaca, jute, hemp, kemp, bagasse, cotton linters, soybean protein, milvet milk, abaca, bamboo, coir, flax, linen, kapok, pina, raffia, ramie, sisal, nettle, buntal, buri, other lignaceous and cellulose fibers, or other oxidized natural fibers that increase acid group content greater than 5.5 meq/100 g (meq=milliequivalents of solute), or combinations thereof. For example, the combination of natural fibers that are used may be a combination of softwood and hardwood fibers, or a combination of softwood fibers and alternate natural fibers.

The synthetic fibers 21 used to form the core layer 3 may be, for example, rayon fibers, renewable polymeric fibers, water-based polyvinyl alcohol (PVA) fibers, acrylic, aramid, Twaron, Kevlar, Technora, Nomex, Microfiber, Modacrylic, Nylon, Olefin, Polyester, Polyethylene, Dyneema, Spectra, Spandex, Vinylon, Vinyon, Zylon, Polypropylene, or Ethylene Vinyl Alcohol, or combinations thereof. The semi-synthetic fibers that can be used to form the core layer 3 may be, for example, modified rayon fibers, regenerated cellulose (from any source such as bamboo, wood, modal, acetate, diacetate, or triacetate), polylactic acid, or polyvinyl alcohol. or combinations thereof. Thus, the core layer 3 may include, for example, one or more natural fibers, such as softwood fibers, and one or more of these synthetic or semisynthetic fibers.

If modified rayon fibers are used as the synthetic fibers 21, the modified rayon fibers may be composed of viscose rayon, lyocell (e.g., Tencel®, manufactured by Lenzing AG of Lenzing, Austria), or combinations thereof and may have an inclusion rate within the range of 10% to 50% by weight, and preferably 25% by weight of the entire tissue. The modified rayon fibers have a length within the range of 1 to 20 mm. The modified rayon fibers may be shaped fibers, such as, for example, fibers having multi-lobal or star-shaped cross sections.

If water-based PVA fibers are used as the synthetic fibers 21, the water-based PVA fibers may be added at an inclusion rate of 10% to 50% by weight, and preferably 25% by weight. The water-based PVA fibers have a length within the range of 4 mm to 20 mm, and may be shaped fibers, such as, for example, fibers having multi-lobal or star-shaped cross sections.

If renewable polymeric fibers are used as the synthetic fibers 21, the renewable polymeric fibers may be composed of poly(lactic acid) (PLA) and may have an inclusion rate within the range of 10% to 50% by weight, and preferably 25% by weight. The renewable polymeric fibers have a length within the range of 4 mm to 20 mm. The renewable polymeric fibers may be shaped fibers, such as, for example, fibers having multi-lobal or star-shaped cross sections.

Wet-end additives may be included in the layers of the wipe 1. In this regard, as known in the art, pulp mixes are subjected to a dilution stage in which water is added to the mixes so as to form a slurry. After the dilution stage but prior to reaching the headbox, each of the pulp mixes are dewatered to obtain a thick stock of about 95% water. In an exemplary embodiment of the invention, wet end additives are introduced into the thick stock pulp mixes of all layers, and in an exemplary embodiment the wet end additives may only be introduced into the thick stock pulp mixes of only the external layers. Suitable wet-end additives include temporary wet strength additives, such as, for example, water-based PVA, glyoxalated polyacrylamide (commonly known as GPAM), carboxyl methyl cellulose (CMC), and combinations thereof, such as a combination of GPAM and CMC. If GPAM is used as the wet-end additive, the GPAM may be present at concentrations ranging from 0.01% to 4% of the weight of the fibers of the wipe 1, and in an exemplary embodiment is present at a concentration of 0.5% of the weight of the fibers of the wipe 1. If carboxyl methyl cellulose is used as the wet-end additive, the carboxyl methyl cellulose may be present at concentrations ranging from 0.01% to 1% of the weight of fibers of the wipe 1, and in an exemplary embodiment is present at a concentration of 0.25% of the weight of fibers of the wipe 1.

Enzymes may also be added to the slurry as a wet-end additive to refine, de-ink and/or bleach recycled pulp. Such enzymes may be present at concentrations ranging from 0.1% to 2% of the weight of fibers. An example of a suitable enzyme is oxidoreductase, which requires a small dose of hydrogen peroxide initiator or ammonium per sulfate.

In an exemplary embodiment, a dry strength additive is added to the thick stock mix for at least one of the layers of the tissue. The dry strength additive may be, for example, amphoteric starch, added in a range of about 1 kg/ton to 15 kg/ton to the thick stock mix.

As an alternative or in addition to the use of wet end additives, the wipe of the present invention may be treated with topical or surface deposited additives. Examples of surface deposited additives include temporary wet strength additives such as GPAM and/or CMC. The temporary wet strength additive may be sprayed directly on the wipe basesheet during the converting process with an add-on up to 1% to 2% of the weight of the fibers of the wipe 1.

Other examples of surface deposited additives include softeners for increasing fiber softness and skin lotions. Examples of topical softeners include but are not limited to quaternary ammonium compounds, including, but not limited to, the dialkyldimethylammonium salts (e.g. ditallowdimethylammonium chloride, ditallowdimethylammonium methyl sulfate, di(hydrogenated tallow)dimethyl ammonium chloride, etc.). Another class of chemical softening agents include the well-known organo-reactive polydimethyl siloxane ingredients, including amino functional polydimethyl siloxane. zinc stearate, aluminum stearate, sodium stearate, calcium stearate, magnesium stearate, spermaceti, and steryl oil. The softener additive may be applied to the basesheet by, for example, spraying, roll coating/anilox roll set up or flexographic/gravure roll coating the wipes when they are a wet laid asset or after the wipes are dried but before wetting solution is added to the package.

In addition to the above, other additives can be incorporated into the slurry prior to deposition onto the forming surface, sprayed onto the web during the wet-laid process or added during the plying step after the web has fully dried. In embodiments, the additives can be added in an amount up to 5% of the weight of fibers of the wipe 1.

The additives can be one or a combination of the following: urea formaldehyde, melamine formaldehyde, poly amide poly amine epichlorohydrin, polyethlyenimine, starch and starch derivatives, aldehyde functionalized starches, chitosan, aldehyde functionalize polyacrylamides, glyoxalated polyacrylamide, glyoxalated copolymer, carboxyl methyl cellulose, polyvinyl alcohol, polyvinyl acetate, polyvinyl amine, polyamide resins, polyacrylamide resins, galactomannan gums such as guar guam and locus bean gum, acrylic emulsions, styrene-butadiene latexes, vinyl acetate polymers, ethylene-vinyl acetate copolymers, vinyl chloride polymers, vinylidene chloride polymers, vinyl chloride-vinylidene copolymers, acrylo-nitrile copolymers, ethylene-acrylic copolymers, latex emulsions, and acrolein copolymers. In embodiments, when added to the slurry, these additives can be added at a concentration ranging from 0.1 to 4% of the weight of fibers, more preferably about 0.5% of the weight of fibers.

The additives can also be a combination of the following: starch and starch derivatives, aldehyde functionalized starches, chitosan, aldehyde functionalize polyacrylamides, glyoxalated polyacrylamide, glyoxalated copolymers, carboxyl methyl cellulose, polyvinyl alcohol, polyvinyl acetate, polyvinyl amine, polyamide resins, polyacrylamide resins, galactomannan gums such as guar guam and locus bean gum, acrylic emulsions, styrene-butadiene latexes, vinyl acetate polymers, ethylene-vinyl acetate copolymers, vinyl chloride polymers, vinylidene chloride polymers, vinyl chloride-vinylidene copolymers, acrylo-nitrile copolymers, ethylene-acrylic copolymers, latex emulsions, and acrolein copolymers. In embodiments, when added to the slurry, these additives can be added at a concentration ranging from 0.1 to 4% of the weight of fibers of the wipe 1, more preferably about 0.5% of the weight of fibers of the wipe 1.

The additives can alternatively be one or a combination of the following: starch and starch derivatives, aldehyde functionalized starches, chitosan, aldehyde functionalize polyacrylamides, glyoxalated polyacrylamide, glyoxylated copolymers, carboxyl methyl cellulose, polyvinyl alcohol, polyvinyl acetate, polyvinyl amine, polyamide resins, polyacrylamide resins, galactomannan gums such as guar guam and locus bean gum. In embodiments, when added to the slurry these additives can be added at a concentration ranging from 0.1 to 4% of weight of fibers of the wipe 1, more preferably about 0.5% of the weight of fibers of the wipe 1.

The additives can alternatively be one or a combination of the following: starch and starch derivatives, aldehyde functionalized starches, chitosan, aldehyde functionalize polyacrylamides, glyoxalated polyacrylamide, glyoxylated copolymers, carboxyl methyl cellulose, polyvinyl alcohol, polyvinyl acetate, polyvinyl amine, polyamide resins, and polyacrylamide resins. In embodiments, when added to the slurry these additives can be added at a concentration ranging from 0.1 to 4% of the weight of fibers of the wipe 1, more preferably about 0.5% of the weight of fibers of the wipe 1. A cleansing solution may be topically applied to the wipe. Examples of cleansing solutions include glycol-based cross-linking chemistry including anhydrides and epoxy groups, cyclo-dextrins with the ability to release fragrances, aloe (such as Aloe E) and shea butter. The cleansing solution can be composed of 90-99.9% water with the remainder being preservative, humectants, moisturizers, pH buffers, surfactants, or aromatic compounds. In embodiments, the aloe or shea butter may be applied in a concentration of up to 0.5% of the cleansing solution. In embodiments, the wet wipe may contain as much as 40% to 90%, by weight of cleansing solution in the final product, and more preferably 70% by weight of cleansing solution in the final product.

Fillers may also be added to the slurry at addition rates of 0.1% to 1% of the weight of the fibers of the wipe 1, more preferably about 0.5% by weight of fibers of the wipe 1. Fillers may be, for example, calcium carbonate particles, clay particles and/or talc particles. Fillers may also be superabsorbent polymers or encapsulated polymers.

The absorbent products or structures that are used for each of the webs for the one or more plies can be manufactured by any known or later-discovered wet-laid method that uses water to form a web. Examples of some known wet-laid technologies that may be used to form a cellulosic (or other natural or synthetic fiber type) web include Through Air Drying (TAD), Uncreped Through Air Drying (UCTAD), Conventional Wet Crepe (CWC), Conventional Dry Crepe (CDC), Advanced Tissue Molding System (ATMOS), NTT, and ETAD.

The Through Air Drying (TAD) and Uncreped Through Air Drying (UCTAD) processes are wet-laid technologies that avoid compaction of the web during drying and thereby produce absorbent products of superior thickness and absorbency when compared to absorbent products of similar basis weight and material inputs that are produced using the CWC or the CDC process. Other wet-laid processes, such as ATMOS, ETAD, and NTT, utilizes some pressing to dewater the web, or a portion of the web, resulting in absorbent products with absorbent capacities that correlate to the amount of pressing utilized when all other variables are the same. Some wet-laid processes are discussed below.

Wet-Laid Processes

Tissue papermaking is a complex process where specific control over product quality attributes is critical. Arguably, the most critical pieces of equipment used to control these quality attributes are the fabrics utilized in the papermaking machines. The various papermaking machine technologies are conventional dry crepe, through air drying (TAD), or hybrid technologies such as Metso's NTT (Metso Corp., Helsinki, Finland), Georgia Pacific's ETAD (Georgia Pacific LLC, Atlanta, Georgia), or Voith's ATMOS process (Voith GmbH, Heidenheim, Germany). All these technologies utilize fabrics at various stages in the process to influence tissue web properties and overall asset productivity.

The predominant manufacturing method for making a tissue web is the conventional dry crepe process. The major steps of the conventional dry crepe process involve stock preparation, forming, pressing, drying, creping, calendering (optional), and reeling the web.

The first step of stock preparation involves selection, blending, mixing, and preparation of the proper ratio of wood, plant, or synthetic fibers along with chemistry and fillers that are needed in the specific tissue grade. This mixture is diluted to over 99% water in order to allow for an even fiber formation when deposited from the machine headbox into the forming section. There are many types of forming sections used in conventional papermaking (inclined suction breast roll, twin wire C-wrap (with a solid or suction forming roll), twin wire S-wrap, suction forming roll, and Crescent formers) but all are designed to retain the fiber, chemical, and filler recipe while allowing the water to drain from the web. In order to accomplish this, fabrics, referred to as "forming fabrics," are utilized.

Forming fabrics are woven structures that utilize monofilaments (yarns, threads) composed of synthetic polymers (usually polyethylene, polypropylene, or nylon). The forming fabric has two surfaces: the sheet side and the machine or wear side. The wear side is in contact with the elements that support and move the fabric and are thus prone to wear. To increase wear resistance and improve drainage, the wear side of the fabric has larger diameter monofilaments compared to the sheet side. The sheet side has finer yarns to promote fiber and filler retention on the fabric surface.

In order to control other properties such as: fabric stability, life potential, drainage, fiber support, and clean-ability, different weave patterns are utilized. Generally, forming fabrics are classified by the number of layers utilized in their construction. There are three basic styles of forming fabrics: single layer, double layer, and triple layer. A single layer fabric is composed of one CD (shute) and one MD (warp) yarn system. The main problem of single layer fabrics is lack of dimensional stability. The double layer forming fabric has one layer of warp yarns and two layers of shute yarns. This multilayer fabric is generally more stable and resistant to stretching. Triple layer fabrics have two separate single layer fabrics bound together by separated yarns called binders. Usually the binder fibers are placed in cross direction but also can be oriented in the machine direction. Triple layer fabrics have further increased dimensional stability, wear potential, drainage, and fiber support than single or double layer fabrics.

The manufacturing of forming fabrics comprises the following operations: weaving, initial heat setting, seaming, final heat setting, and finishing. The fabric is made in a loom using two interlacing sets of monofilaments (or threads or yarns). The longitudinal threads are called the warp and the transverse threads are called shute threads. After weaving, the forming fabric is heated to relieve internal stresses to enhance dimensional stability of the fabric. The next step in manufacturing is seaming. This step converts the flat woven fabric into and endless forming fabric by joining the two MD ends of the fabric. After seaming, the final heat setting is applied to stabilize and relieve the stresses in the seam area. The final step in the manufacturing process is finishing, where the fabric is cut to width and sealed.

There are several parameters and tools used to characterize the properties of the forming fabric: mesh and count, caliper, frames, plane difference, open area, air permeability, void volume and distribution, running attitude, fiber support, drainage index, and stacking. None of these parameters can be used individually to precisely predict the performance of a forming fabric on a paper machine, but together the expected performance and sheet properties can be estimated.

In a conventional process, after web formation and drainage (to around 35% solids) in the forming section (assisted by centripetal force around the forming roll, and vacuum boxes in several former types), the web is transferred to a press fabric upon which the web is pressed between a rubber or polyurethane covered suction pressure roll and Yankee dryer. The press fabric is a permeable fabric designed to uptake water from the web as it is pressed in the press section. It is composed of large monofilaments or multifilamentous yarns, needled with fine synthetic batt fibers to form a smooth surface for even web pressing against the Yankee dryer.

After pressing the sheet, between a suction pressure roll and a steam heated cylinder (referred to as a Yankee dryer), the web is dried from up to 50% solids to up to 99% solids using the steam heated cylinder and hot air impingement from an air system (air cap or hood) installed over the steam cylinder. The sheet is then creped (i.e. removed) from the steam cylinder using a steel or ceramic doctor blade. This is a critical step in the conventional dry crepe process. The creping process greatly affects softness as the surface topography is dominated by the number and coarseness of the crepe bars (finer crepe is much smoother than coarse crepe). Some thickness and flexibility is also generated during the creping process. If the process is a wet crepe process, the web must be conveyed between dryer fabrics through steam heated after-dryer cans to dry the web to the required finished moisture content. After creping, the web is optionally calendered and reeled into a parent roll and ready for the converting process.

The through air dried (TAD) process is another manufacturing method for making a tissue web. The major steps of the through air dried process are stock preparation, forming, imprinting, thermal pre-drying, drying, creping, calendering (optional), and reeling the web. The stock preparation and forming steps are similar to conventional dry creping.

Rather than pressing and compacting the web, as is performed in conventional dry crepe, the web undergoes the steps of imprinting and thermal pre-drying. Imprinting is a step in the process where the web is transferred from a forming fabric to a structured fabric (or imprinting fabric) and subsequently pulled into the structured fabric using vacuum (referred to as imprinting or molding). This step imprints the weave pattern (or knuckle pattern) of the structured fabric into the web. This imprinting step has a tremendous effect on the softness of the web, both affecting smoothness and the bulk structure. The design parameters of the structured fabric (weave pattern, mesh, count, warp and weft monofilament diameters, caliper, air permeability, and optional over-laid polymer) are, therefore, critical to the development of web softness. The manufacturing method of an imprinting fabric is similar to a forming fabric, except for an additional step if an overlaid polymer is utilized. These type of fabrics are disclosed in patents such as U.S. Pat. Nos. 5,679,222; 4,514,345; 5,334,289; 4,528,239 and 4,637,859, hereby incorporated by reference. Essentially, fabrics produced using these methods result in a fabric with a patterned resin applied over a woven substrate. The benefit is that resulting patterns are not limited by a woven structure and can be created in any desired shape to enable a higher level of control of the web structure and topography that dictate web quality properties.

After imprinting, the web is thermally pre-dried by moving hot air through the web while it is conveyed on the structured fabric. Thermal pre-drying can be used to dry the web to over 90% solids before it is transferred to a steam heated cylinder. The web is then transferred from the structured fabric to the steam heated cylinder though a very low intensity nip (up to 10 times less than a conventional press nip) between a solid pressure roll and the steam heated cylinder. The only portions of the web that are pressed between the pressure roll and steam cylinder rest on knuckles of the structured fabric, thereby, protecting most of the web from the light compaction that occurs in this nip. The steam cylinder and an optional air cap system, for impinging hot air, then dry the sheet to up to 99% solids during the drying stage before creping occurs. The creping step of the process again only affects the knuckle sections of the web that are in contact with the steam cylinder surface. Due to only the knuckles of the web being creped, along with the dominant surface topography being generated by the structured fabric, and the higher thickness of the TAD web, the creping process has much smaller effect on overall softness as compared to conventional dry crepe. After creping, the web is optionally calendered and reeled into a parent roll and ready for the converting process from a basesheet to a multi-ply material, if desired. Some TAD machines utilize fabrics (similar to dryer fabrics) to support the sheet from the crepe blade to the reel drum to aid in sheet stability and productivity. Examples of creped through air dried products are described in U.S. Pat. Nos. 3,994,771; 4,102,737; 4,529,480 and 5,510,002, hereby incorporated by reference.

A variation of the TAD process where the sheet is not creped, but rather dried to up to 99% using thermal drying and blown off the structured fabric (using air) to be optionally calendered and reeled also exits. This process is called UCTAD or un-creped through air drying process. An example of an uncreped through air dried product is described in U.S. Pat. No. 5,607,551, hereby incorporated by reference.

A newer process/method and paper machine system for producing tissue has been developed by the Voith GmbH and is being marketed under the name ATMOS. The process/method and paper machine system has several patented variations, but all involve the use of a structured fabric in conjunction with a belt press. The major steps of the ATMOS process and its variations are stock preparation, forming, imprinting, pressing (using a belt press), creping, calendering (optional), and reeling the web.

The stock preparation step is the same as a conventional or TAD machine would utilize. The purpose is to prepare the proper recipe of fibers, chemical polymers, and additives that are necessary for the grade of tissue being produced, and diluting this slurry to allow for proper web formation when deposited out of the machine headbox (single, double, or triple layered) to the forming surface. The forming process can utilize a twin wire former (as described in U.S. Pat. No. 7,744,726) a Crescent Former with a suction Forming Roll (as described in U.S. Pat. No. 6,821,391), or preferably a Crescent Former (as described in U.S. Pat. No. 7,387,706). The preferred former is provided a slurry from the headbox to a nip formed by a structured fabric (inner position/in contact with the forming roll) and forming fabric (outer position). The fibers from the slurry are predominately collected in the valleys (or pockets, pillows) of the structured fabric and the web is dewatered through the forming fabric. This method for forming the web results in a unique bulk structure and surface topography as described in U.S. Pat. No. 7,387,706 (FIG. 1 through FIG. 11). The fabrics separate after the forming roll with the web staying in contact with the structured fabric. At this stage, the web is already imprinted by the structured fabric, but utilization of a vacuum box on the inside of the structured fabric can facilitate further fiber penetration into the structured fabric and a deeper imprint.

The web is now transported on the structured fabric to a belt press. The belt press can have multiple configurations. A belt press configurations used in conjunction with a structured fabric can be viewed in U.S. Pat. No. 7,351,307, incorporated by reference herein, where the web is pressed against a dewatering fabric across a vacuum roll by an extended nip belt press. The press dewaters the web while protecting the areas of the sheet within the structured fabric valleys from compaction. Moisture is pressed out of the web, through the dewatering fabric, and into the vacuum roll. The press belt is permeable and allows for air to pass through the belt, web, and dewatering fabric, into the vacuum roll enhancing the moisture removal. Since both the belt and dewatering fabric are permeable, a hot air hood can be placed inside of the belt press to further enhance moisture removal as shown in FIG. 14 of U.S. Pat. No. 7,351,307. Alternately, the belt press can have a pressing device arranged within the belt which includes several press shoes, with individual actuators to control cross direction moisture profile, (see FIG. 28 in U.S. Pat. Nos. 7,951,269 or 8,118,979, or FIG. 20 of U.S. Pat. No. 8,440,055, each of which are hereby incorporated by reference) or a press roll (see FIG. 29 in U.S. Pat. Nos. 7,951,269 or 8,118,979, or FIG. 21 of U.S. Pat. No. 8,440,055, each of which are hereby incorporated by reference). The preferred arrangement of the belt press has the web pressed against a permeable dewatering fabric across a vacuum roll by a permeable extended nip belt press. Inside the belt press is a hot air hood that includes a steam shower to enhance moisture removal. The hot air hood apparatus over the belt press can made more energy efficient by reusing a portion of heated exhaust air from the Yankee air cap or recirculating a portion of the exhaust air from the hot air apparatus itself (see U.S. Pat. No. 8,196,314, hereby incorporated by reference). In further embodiments of the drying system composed of the hot air apparatus and steam shower in the belt press section are described in U.S. Pat. Nos. 8,402,673, 8,435,384 and 8,544,184 (each of which are hereby incorporated by reference).

After the belt press is a second press to nip the web between the structured fabric and dewatering felt by one hard and one soft roll. The press roll under the dewatering fabric can be supplied with vacuum to further assist water removal. This preferred belt press arrangement is described in U.S. Pat. Nos. 8,382,956, and 8,580,083, each of which are hereby incorporated by reference, with FIG. 1 showing the arrangement. Rather than sending the web through a second press after the belt press, the web can travel through a boost dryer (FIG. 15 of U.S. Pat. Nos. 7,387,706 or 7,351,307, each of which are hereby incorporated by reference), a high pressure through air dryer (FIG. 16 of U.S. Pat. Nos. 7,387,706 or 7,351,307, each of which are hereby incorporated by reference), a two pass high pressure through air dryer (FIG. 17 of U.S. Pat. Nos. 7,387,706 or 7,351,307, each of which are hereby incorporated by reference) or a vacuum box with hot air supply hood (FIG. 2 of U.S. Pat. No. 7,476,293, hereby incorporated by reference). In addition, U.S. Pat. Nos. 7,510,631, 7,686,923, 7,931,781 8,075,739, and 8,092,652 (each of which are hereby incorporated by reference) further describe methods and systems for using a belt press and structured fabric to make tissue products each having variations in fabric designs, nip pressures, dwell times, etc. and are mentioned here for reference. A wire turning roll can be also be utilized with vacuum before the sheet is transferred to a steam heated cylinder via a pressure roll nip (see FIG. 2a of U.S. Pat. No. 7,476,293, hereby incorporated by reference).

The sheet is now transferred to a steam heated cylinder via a press element. The press element can be a through drilled (bored) pressure roll (FIG. 8 of U.S. Pat. No. 8,303,773, hereby incorporated by reference), a through drilled (bored) and blind drilled (blind bored) pressure roll (FIG. 9 of U.S. Pat. No. 8,303,773, hereby incorporated by reference), or a shoe press (see U.S. Pat. No. 7,905,989, hereby incorporated by reference). After the web leaves this press element to the steam heated cylinder, the % solids are in the range of 40-50% solids. The steam heated cylinder is coated with chemistry to aid in sticking the sheet to the cylinder at the press element nip and also aid in removal of the sheet at the doctor blade. The sheet is dried to up to 99% solids by the steam heated cylinder and installed hot air impingement hood over the cylinder. This drying process, the coating of the cylinder with chemistry, and the removal of the web with doctoring is explained in U.S. Pat. Nos. 7,582,187 and 7,905,989, each of which are hereby incorporated by reference. The doctoring of the sheet off the Yankee, creping, is similar to that of TAD with only the knuckle sections of the web being creped. Thus the dominant surface topography is generated by the structured fabric, with the creping process having a much smaller effect on overall softness as compared to conventional dry crepe.

The web is now optionally calendered, slit, and reeled in preparation for the converting process.

The ATMOS manufacturing technique is often described as a hybrid technology because it utilizes a structured fabric like the TAD process, but also utilizes energy efficient means to dewater the sheet like the Conventional Dry Crepe process. Other manufacturing techniques which employ the use of a structured fabric along with an energy efficient dewatering process are the ETAD process and NTT process. The ETAD process and products are described in U.S. Pat. Nos. 7,339,378, 7,442,278, and 7,494,563, each of which are hereby incorporated by reference. This process can utilize any type of former such as a Twin Wire Former or Crescent Former. After formation and initial drainage in the forming section, the web is transferred to a press fabric where it is conveyed across a suction vacuum roll for water removal, increasing web solids up to 25%. Then the web travels into a nip formed by a shoe press and backing/transfer roll for further water removal, increasing web solids up to 50%. At this nip, the web is transferred onto the transfer roll and then onto a structured fabric via a nip formed by the transfer roll and a creping roll. At this transfer point, speed differential can be utilized to facilitate fiber penetration into the structured fabric and build web caliper. The web then travels across a molding box to further enhance fiber penetration if needed. The web is then transferred to a Yankee dryer where is can be optionally dried with a hot air impingement hood, creped, calendared, and reeled. The NTT process and products are described in International Patent Application Publication No. WO 2009/061079 A1, hereby incorporated by reference. The process has several embodiments, but the key step is the pressing of the web in a nip formed between a structured fabric and press felt. The web contacting surface of the structured fabric is a non-woven material with a three dimensional structured surface comprised of elevation and depressions of a predetermined size and depth. As the web is passed through this nip, the web is formed into the depression of the structured fabric since the press fabric is flexible and will reach down into all of the depressions during the pressing process. When the felt reaches the bottom of the depression, hydraulic force is built up which forces water from the web and into the press felt. To limit compaction of the web, the press rolls will have a long nip width which can be accomplished if one of the rolls is a shoe press. After pressing, the web travels with the structured fabric to a nip with the Yankee dryer, where the sheet is optionally dried with a hot air impingement hood, creped, calendered, and reeled.

In embodiments, the fabric in the inner position of a former, such as the Crescent former, is a structured fabric. Structured fabrics can be manufactured using 3D printing techniques and materials that can be utilized with 3D printers. The structured fabric may comprise a cast or extruded polymer film with holes produced using a laser. The structured fabric may be a woven structure that utilizes monofilaments (yarns, threads) made of synthetic polymers (usually polyethylene, polypropylene, or nylon) that may be overlaid with a patterned polymer resin. The structured fabric may be produced using any of various processes for making a three-dimensional object primarily through additive processes in which successive layers of material are laid down under computer control. These processes are generally classified as 3-D printing technologies and include but are not limited to any of the following: Fused Deposition Modeling (FDM), PolyJet Technology, Selective Laser Melting (SLM), Direct Metal Laser Sintering (DMLS), Selective Laser Sintering (SLS), Stereolithography (SLA), or Laminated Object Manufacturing (LOM).

In Conventional Dry Crepe and Conventional Wet Crepe methods, a nascent web is formed in a forming structure, the web is transferred to a dewatering felt where it is pressed to remove moisture, and the web is then adhered to a Yankee Dryer. The web is then dried and creped from the Yankee Dryer and reeled. When creped at a solids content of less than 90%, the process is referred to as Conventional Wet Crepe. When creped at a solids content of greater than 90%, the process is referred to as Conventional Dry Crepe.

Additional processes for manufacturing wetlaid tissue can be found in U.S. Pat. No. 8,968,517, issued Mar. 3, 2015 and entitled "Soft Through Air Dried Tissue" and Ser. No. 14/561,802, filed Dec. 5, 2014, and entitled "Towel with Quality Wet Scrubbing Properties at Relatively Low Basis Weight and an Apparatus and Method for Producing Same."

Single Ply Product

Figure 2:
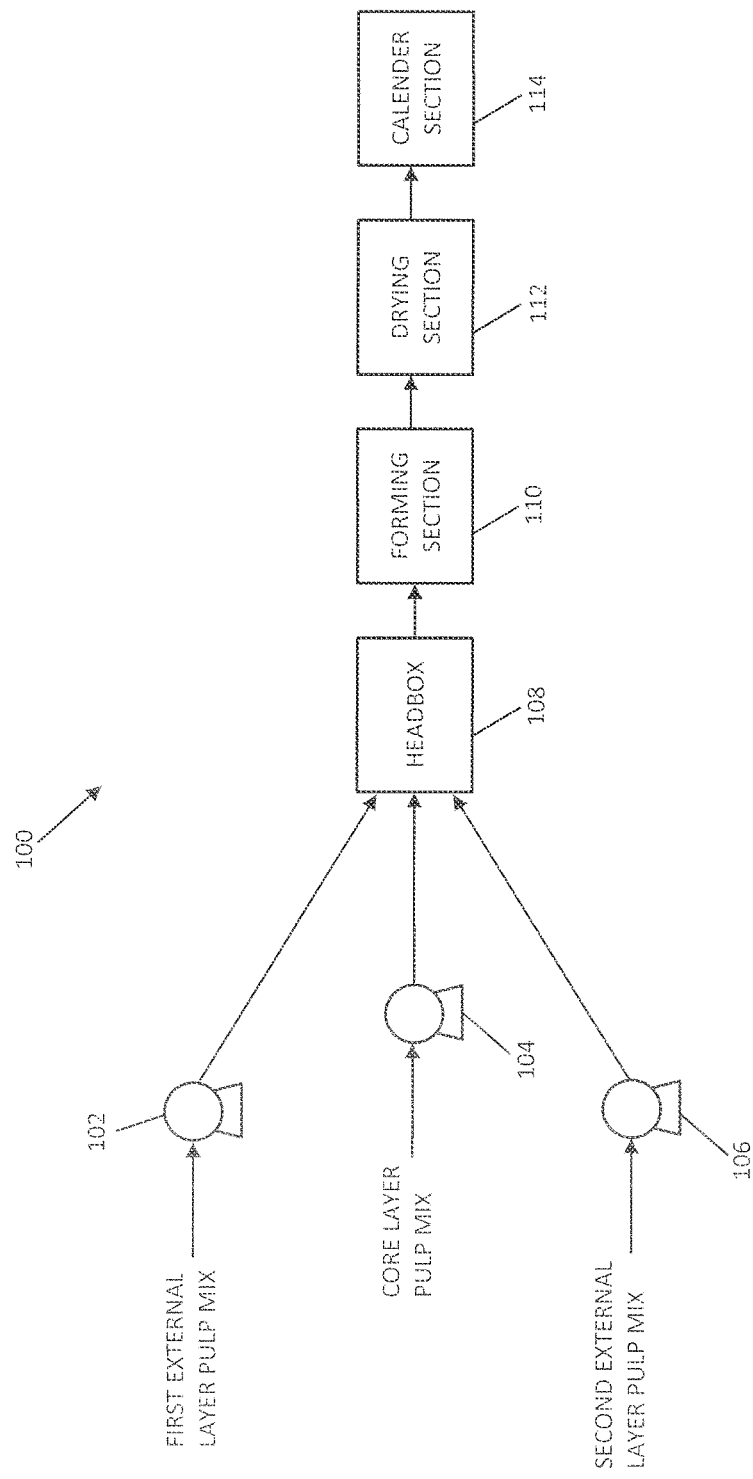
FIG. 2 is a block diagram of a system for manufacturing a single ply wipe according to an exemplary embodiment of the present invention.

FIG. 2 is a block diagram of a system for manufacturing a single ply of a wipe, generally designated by reference number 100, according to an exemplary embodiment of the present invention. The system 100 includes a first exterior layer fan pump 102, a core layer fan pump 104, a second exterior layer fan pump 106, a headbox 108, a forming section 110, a drying section 112 and a calendar section 114. The headbox 108 is a stratified headbox (e.g., a triple layer headbox for a three layer ply, a double layer headbox for a two layer ply) to form multilayer plies. Alternatively, multiple headboxes may be provided, with a separate headbox corresponding to a separate layer of the multi-layer wipe. In embodiments, all three headbox layers may be formed using foam forming. In other embodiments, only the core layer is formed using foam forming. In another exemplary embodiment of the invention, long fibers may be incorporated via a regular water forming headbox separate from headbox 108.

The first and second exterior layer fan pumps 102, 106 deliver the furnish of the first and second external layers 2, 4 to the headbox 108, and the core layer fan pump 104 delivers the foamed furnish of the core layer 3 to the headbox 108. The foamed furnish includes a dispersion of fibers in a foamed liquid containing water and a surfactant. The foam forming surfactants could be anionic, cationic, non-ionic or amphoteric depending on their ability to generate a foamed dispersion. Some examples of anionic surfactants include sodium dodecyl sulfate (SDS), sodium alkyl ether sulphate (SAES) and alkyl ketene dimer (AKD) based labile surfactant. A typical example of ionic surfactants is alpha olefin sulfonate and some examples of non-ionic surfactants include alkyl glucosides and ethoxylated alcohols such as a peg-6 lauramide. The following steps are performed:

Deposition of Slurry from Headbox onto Forming Surface: As is known in the art, the headbox delivers a wet web of pulp onto a forming wire, such as a Fourdrinier wire or a twin wire former, within the forming section 110. The wet web is delivered to the forming wire with the foamed core layer 3 disposed between the first and second external layers 2, 4. The laying down of the foamed core layer 3 results in a foam formed fibrous web disposed between the first and second external layers 2, 4. The foam forming may be accomplished in a single layer or multilayer headbox using surfactants injected into the thin stock loop and modified pumping systems specifically designed to handle entrained air.

Drainage of Slurry across Forming Surface to Dewater the Nascent Web: At least some dewatering may occur in the forming section 110. Water and surfactant removed from the foam formed core layer 3 during dewatering may be recycled.

Imprinting the Web Using a Structured Fabric and Pre-Drying the web: After formation in the forming section 110, the wet web may be imprinted with a structured fabric and, in embodiments, may be pre-dried.

Drying the Web upon a Steam-heated Cylinder: Next, the web is transferred to the drying section 112. Within the drying the section 112, the wet web may be dewatered using an ATMOS system, such as a twin wire ATMOS system as described in U.S. Pat. No. 7,744,726, the disclosure of which is incorporated herein by reference in its entirety, or an NTT system, available from Valmet Corporation, of Espoo Finland. After dewatering, the dewatered web may be dried using a Yankee drying drum. Drying is completed using hot air impingement produced through TAD technology.

As noted in regards to an ATMOS drying process, the web is pressed against a dewatering fabric across a vacuum roll by an extended nip belt press. The vacuum roll applies negative pressure to a surface of the permeable dewatering fabric which is opposite to a surface of the permeable dewatering fabric which contacts the web, drawing moisture from the web through the dewatering fabric into the vacuum roll. The vacuum roll may have a diameter of between approximately 1000 mm and approximately 2500 mm. In addition, in embodiments, the permeable dewatering fabric comprises a felt with a batt layer. The fabric may have a caliper of between approximately 0.1 mm and approximately 15 mm, a permeability value of between approximately 1 cfm and approximately 500 cfm, an overall density of between approximately 0.2 $g/cm^3$ and approximately 1.1 $g/cm^3$ and a weight of between approximately 350 $g/m^2$ and approximately 3000 $g/m^2$. Also, in embodiments, an extended nip belt press comprises a permeable belt with a tension of between approximately 20 kN/m and approximately 100 kN/m, a permeability value of between approximately 100 cfm and approximately 1200 cfm, a surface contact area of the paper web side that is between approximately 0.5% and approximately 90% when not under tension, and an open area of between approximately 1.0% and approximately 85%. In embodiments, the extended nip of the belt press has an angle of wrap of between approximately 30 degrees and approximately 180 degrees, and, in embodiments, the extended nip has a nip length of between approximately 800 mm and approximately 2500 mm.

A hot air impingement hood may be installed inside of the belt press, and a steam shower may be installed inside the hot air impingement hood. Where the hood is used, a portion of exhaust air from an air cap installed over the steam heated cylinder is utilized as makeup air for the installed hood inside the belt press. Additionally, shoe presses may be installed inside the hot air impingement hood or may be installed inside of the belt press rather than a hot air impingement hood. Alternatively, a press roll may be installed inside of the belt press rather than installing shoe presses or a hot air impingement hood.

Creping the Web from the Steam-heated Cylinder: In an exemplary embodiment, a creping adhesive is applied to the drum prior to the dewatered web contacting the drum. After drying, a creping blade is used to remove the wipe from the Yankee drying drum, such as with a steel or ceramic doctor blade. The creping may be performed with or without a hot air impingement hood. At that point, the web has a solids content of approximately 15% to 1% solids.

Optionally Calendering the Web: The wipe may then be calendered in a subsequent stage within the calender section 114. According to an exemplary embodiment, calendering may be accomplished using a number of calender rolls (not shown) that deliver a calendering pressure in the range of 0-100 pounds per linear inch (PLI). In general, increased calendering pressure is associated with reduced caliper and a smoother tissue surface.

Reeling the Web onto a Parent Roll and Unwinding the Web: The formed web may be reeled on a parent roll, such as one of the parent rolls 208, 209 shown in FIG. 3. For a single ply wipe, the parent roll is unwound while a binder is applied to the roll.

To meet the "flushability" requirements of INDA and to reduce the events of pluggage within household sanitation systems as well as wastewater treatment facilities, nonwoven wipes can incorporate unique binders. The binders allow the wipe to be pre-moistened and retain its strength, but the binder will dissociate causing the nonwoven to lose its strength and disperse when flushed into a toilet. The binder may be used as an adhesive or as part of the adhesive to hold the multiple plies together before the wipe is disposed of Some examples of these binders are polymers that are insoluble in warm water, but are soluble in cold water, such as found in a toilet. An example of a nonwoven product incorporating this type of binder is shown in U.S. Pat. No. 5,509,913. Other types of binders are polymers that are ion sensitive. When a wipe is pre-moistened with a solution containing a high ion concentration the binder remains insolvent and the nonwoven retains its strength. When flushed into a toilet the containing soft water, the binder dissociates and the wipe can disperse. Other types of binders suitable for wipes that may be "flushable" by INDA standards are known, such as binders described in U.S. Pat. Nos. 5,281,306 and 7,157,389.

The binder may applied via roll coating such as with a roto-gravure or flexographic coating that is applied to the web. As another alternative, the application of the binder may be performed via spray coating or spin disc coating equipment. The binder may be applied in a particular pattern with surface coverage of the web ranging from 0 to 100%, and more preferably 50% surface coverage. The pattern may be a repeating pattern with each component of the pattern defining an open area free of binder. Exemplary patterns include polygonal-shaped patterns, such as diamond or triangular shaped patterns.

When pre-moistening the wipe, the binder contributes to retaining the integrity of the wipe prior to disposal. The particular binder that is used may be, for example, a polyethylene, vinyl acetate ethylene copolymers, vinyl-based or acrylic binders, or combinations thereof. Thus, possible binders may include a poly(vinyl) alcohol, poly(vinyl) acetate, poly (ethylene) (vinyl) alcohols, poly (ethylene) (vinyl) acetate, copolymers of vinyl acetate-ethylene, starch based chemistries or combinations thereof. The binder may also contain additional components such as a cross-linking agent including epoxy, amide and anhydride based chemistries, or ion sensitive polymers comprising acrylic acid, alkyl or aryl acrylates, terpolymers which comprise partially neutralized acrylic acid, butyl acrylate and 2-ethylhexyl acrylate. The binder also may comprise of additional trigger chemistries such as boric acid at concentrations ranging from 0.1 to 5% by weight, as well as additional trigger salt chemistries such as sodium chloride. The trigger chemistries, such as boric acid, can alternatively or also be included in the cleansing solution that is applied to the wipe 1.

After being applied, the binder may be cured at high temperatures in the range of 200 to 250° F. using methods such as infrared, UV, or other non-contact heating devices.

After that, the single ply wipe may be cut, folded and packaged with wetting, cleansing solution.

Multi-Ply Product

In another exemplary embodiment, a wipe according to the present invention may comprise two or more plies formed from two webs formed according to the process described with respect to FIG. 2 that are laminated together to create a multi-ply wipe. Each ply of a multi-ply wipe of the present invention may be made of the same type(s) of fibers or different fibers may be used in some or all of the plies. In a preferred embodiment, the plies have the same multi-layer tissue structure and composition.

Where the wipe is to be formed of two plies, the wipes are obtained by applying a binder between the two or more plies, embossing the plies, and then using a marrying roll following the embossment.

Figure 3:
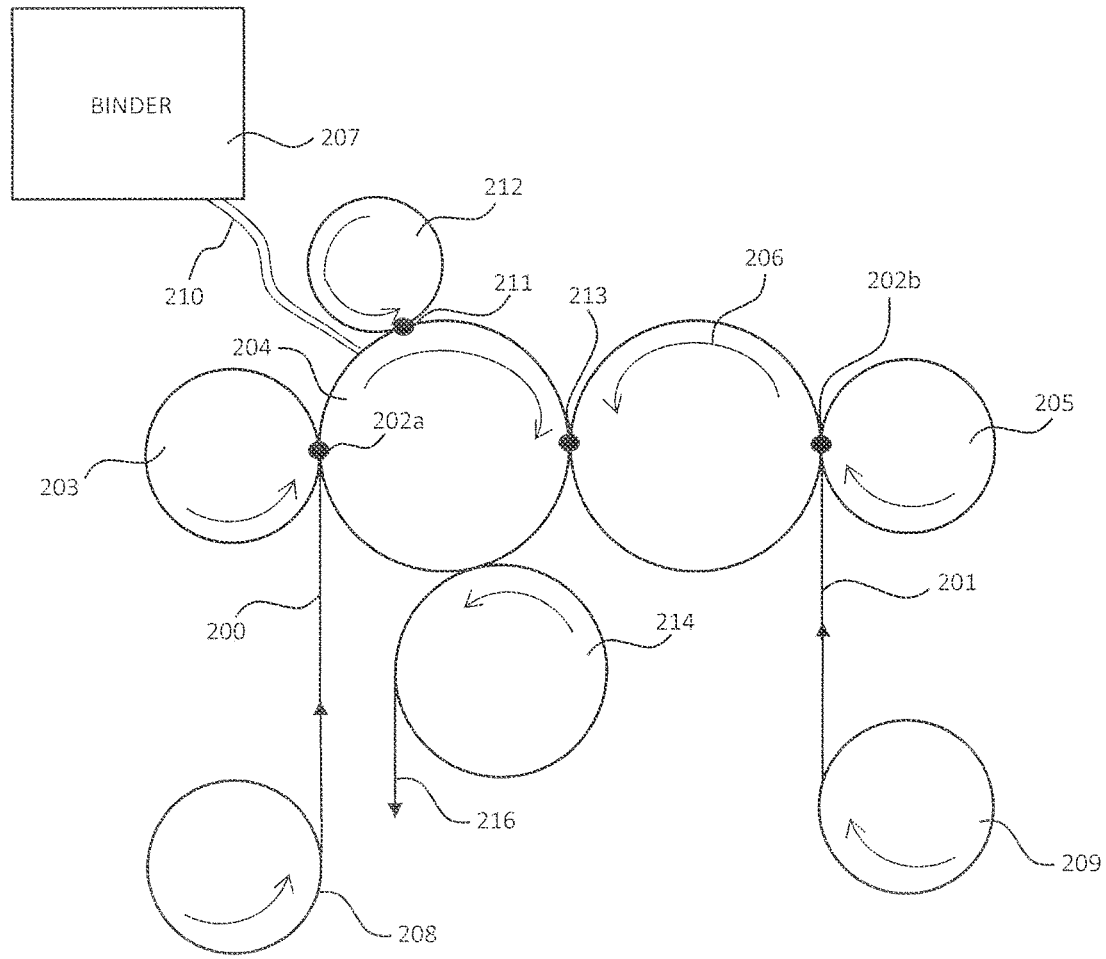
FIG. 3 is a block diagram of a system for manufacturing a multi-ply wipe product according to an exemplary embodiment of the present invention.
Figure 4:
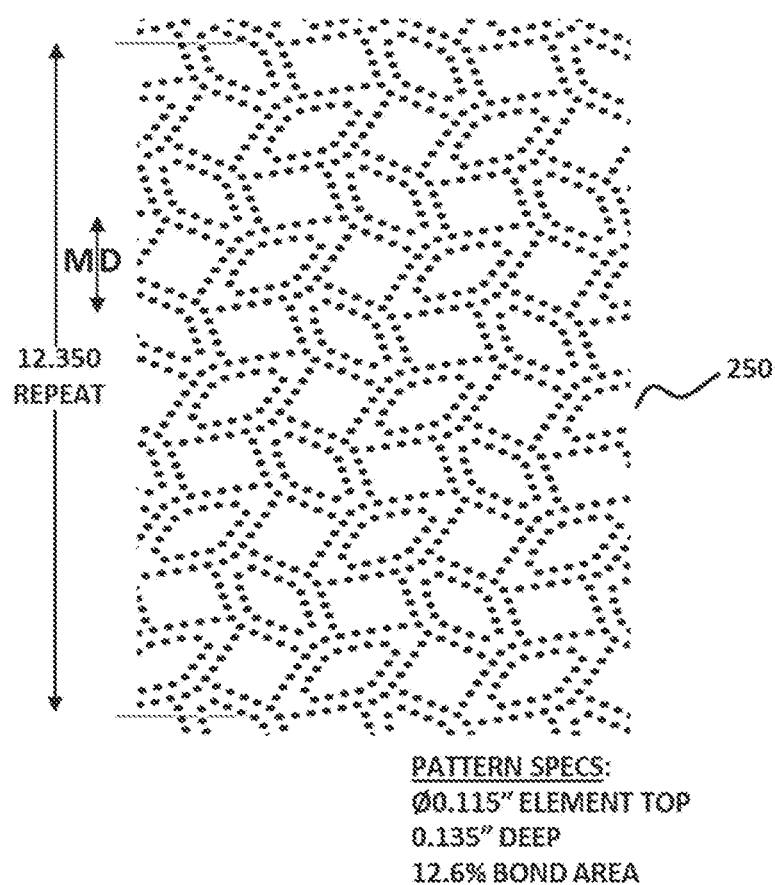
FIG. 4 shows an embodiment of a wipe that has an embossment pattern in accordance with an exemplary embodiment of the present invention.

FIG. 3 shows an apparatus for manufacturing a laminate of two plies of a wipe that are joined to each other, in a face-to-face relationship, using an exemplary embodiment of the present invention. As shown in the figure, each of two webs 200, 201 of single ply web, which may be manufactured, for example, according to a method described above, is unwound and fed from each of parent rolls 208, 209 to respective pairs of mated pressure rolls 203, 205 and substantially axially parallel embossing rolls 204, 206. A first web 200 is thus fed through a nip 202*a* formed by pressure roll 203 and embossing roll 204 (also known as a pattern roll) and a second web 201 is likewise fed through a nip 202*b* between pressure roll 205 and embossing roll 206. The embossing rolls 204, 206, which rotate in the illustrated directions, impress an embossment pattern onto the webs as they pass through nip 202*a* and 202*b*. An exemplary embossment pattern for the wipe is shown in FIG. 4. After being embossed, each ply may have a plurality of embossments protruding outwardly from the plane of the ply towards the adjacent ply. The adjacent ply likewise may have opposing protuberances protruding towards the first ply. If a three ply product is produced by adding a third pair of mated pressure and embossing rolls, the central ply may have embossments extending outwardly in both directions.

To perform the embossments at nips 202a and 202b, the embossing rolls 204, 206, which may be hard or soft covered, have embossing tips or embossing knobs that extend radially outward from the rolls to make the embossments. In embodiments, the depth of the knobs may be between 25 to 1000 thousandths of an inch. In the illustrated embodiment, embossing is performed by nested embossing in which the crests of the embossing knobs on one embossing roll intermesh with the embossing knobs on the opposing embossing roll and a nip is formed between the embossing rolls. As the web is fed through nips 202a and 202b, a pattern is produced on the surface of the web by the interconnectivity of the knobs on an embossing roll with the open spaces of the respective pressure roll.

An adhesive applicator roll 212 is positioned upstream of the nip 213 formed between the two embossing rolls and is aligned in an axially parallel arrangement with one of the two embossing rolls to form a nip therewith. A binder is fed from a tank 207 via a conduit 210 to applicator roll 212. The applicator roll 212 transfers a binder to an interior side of embossed ply 200 to adhere the at least two plies 200, 201 together, wherein the interior side is the side of ply 200 that comes into a face-to-face relationship with ply 201 for lamination. The binder is applied to the ply at the crests of the embossing knobs 205 on embossing roll 204. The binder may alternatively or in addition applied via roll coating such as with a roto-gravure or flexographic coating that is applied to the one or two webs (or more webs, when present) before the webs are pressed together between the embossing rolls 204 or 206 to be plied. As another alternative to the use of an applicator roll 212 to apply the binder or in addition to that, the application of the binder may be performed via spray coating or spin disc coating equipment to the one or two webs before the webs are pressed together between the two embossing rolls. As described previously in regards to the single ply wipe, the binder may be applied in a particular pattern with surface coverage of the web ranging from 0 to 100%, and more preferably 50% surface coverage.

After being applied, the binder may be cured at high temperatures in the range of 200 to 250° F. using methods such as infrared, UV, or other non-contact heating devices.

The webs are then fed through the nip 213 where the embossing patterns on each embossing roll 204, 206 mesh with one another. After application of the embossments and the binder, a marrying roll 214 is used to apply pressure for lamination. The marrying roll 214 forms a nip with the same embossing roll 204 that forms the nip with the applicator roll 212, downstream of the nip formed between the two embossing rolls 204, 206. The marrying roll 214 is generally needed because, in nested embossing, the crests of the nested embossing knobs 205 typically do not touch the perimeter of the opposing roll 206 at the nip 213 formed therebetween.

The specific pattern that is embossed on the absorbent products can improve the adhesion properties of the plies. In an exemplary embodiment, the embossed area (or "bond area") on any ply may cover between approximately 5 to 15% of the surface area of the ply. The size of each embossment may be between approximately 0.04 to 0.08 square centimeters. The depth of each embossment may be between 0.28 and 0.43 centimeters (0.110 and 0.170 inches) in depth.

FIG. 4 shows a sample pattern embossed on a wipe 250 according to an embodiment of the present invention. In the illustrated pattern, the embossed area covers approximately 13% of the surface, the embossment depth is approximately 0.34 centimeters (0.135 inches), and the embossment diameter is approximately 0.92 centimeters (0.115 inches).

The laminate is then cut, folded and packaged.

In exemplary embodiments, the following properties may be exhibited by flushable and dispersible multi-ply wet wipes made using a TAD process:
  (1) Air Porosity: Below 40 cfm with a basis weight below 90 gsm;
  (2) MD Tensile Strength: Between 30 N/m to 250 N/m, preferably between 50 N/m to 150 N/m;
  (3) CD Tensile Strength: Between 30 N/m to 250 N/m, preferably between 50 N/m to 150 N/m;
  (4) Caliper: Between 300 to 1500 microns, preferably between 400 to 1250 microns.

In exemplary embodiments, the following properties may be exhibited by single ply wipes and multi-ply flushable and dispersible wet wipes made using a UCTAD process:
  (1) Air Porosity: Below 40 cfm;
  (2) MD Tensile Strength: Between 30 N/m to 250 N/m, preferably between 75 N/m to 150 N/m;
  (3) CD Tensile Strength: Between 30 N/m to 250 N/m, preferably between 75 N/m to 150 N/m;
  (4) Caliper: Between 500 to 1500 microns, preferably between 750 to 1250 microns.

The following discussion describes the techniques that were used to determine the basis weights, fiber length, MD and CD stretch and tensile strength, caliper, and air porosity in connection with the present invention.

Basis Weight

The basis weight for the present invention was measured in grams/m$^2$ using the following process. Using a dye and press, six approximately 76.2 mm by 76.2 mm (approximately 3 inch×3 inch) square samples were cut from each two-ply product that was tested with care being taken to avoid any web perforations in the sample. The samples were placed in an oven at 105 degrees Celsius for 5 minutes and were thereafter weighed on an analytical balance to the fourth decimal point. The weight of the sample in grams was then divided by $(0.0762\ m)^2$ to determine the basis weight in grams/m$^2$.

Fiber Length Measurements

Fiber lengths and other fiber morphology of a pulp sample, such as coarseness, kink, and curl may be measured. The test uses a standard disintegrator capable of operating at 3,000 RPM, a Fiber Quality Analyzer, an oven as well as the standard supplies for consistency determination, a bucket and beaker set for dilution, and a desiccator with active desiccant crystals. (Ensure that the crystals are not saturated with moisture.)

To prepare the sample, determine the sample's consistency and weigh out the equivalent of 3 grams (o.d. basis). (If the sample is in dry sheet form, assume a 10% moisture content and tear 3.3 grams from the sheet. Do not use cut edges, and be careful to take the fill thickness of the sheet. Any dry samples must be soaked in water for no less than 4 hours, and as long as overnight.) Dilute the samples to 2 liters (2,000 ml) using water, and disintegrate in the standard disintegrator at 3,000 RPM for 1 minute.

If the sample is softwood, tare a clean bucket on the lab balance, add the disintegrated pulp and add water to make up the total sample weight to 8,000 grams. This will set the consistency at approximately 0.0375%. If the sample is hardwood, tare a clean bucket on the lab balance, but only add 1 liter (1,000 ml) of the disintegrated pulp. Again, add water to make up the total sample weight to 8,000 grams. This will set the consistency at approximately 0.0188%. If a coarseness measurement is not required, skip to dilution testing. If a coarseness measurement is required, a consistency determination is performed as follows.

Oven dry two filter papers and cool them in the desiccator for 2 minutes before weighing them. Label these as Consistency 1 and Consistency 2, and record their weights on the back of the filter paper. Mix the diluted sample thoroughly, in a FIG. 8 motion or an irregular motion. (Circular mixing will cause larger fibers to separate out towards the outer perimeter of the container.) With constant mixing, quickly withdraw two 1,000 gram samples, record their exact weights, and filter them on the two pre-weighted filter papers. (Note that very precise consistency is required. Take special care to rinse fibers from the sides of the funnel and the edges of the filter paper.)

Dry the consistency pads in a speed dryer for approximately five minutes, then transfer to an oven for 10 minutes at 105° C. Do not place additional wet material in the oven during this process. Cool the pads in the desiccator, and weigh to an accuracy of at least 3 decimal places. Repeat the drying/cooling/weighing procedure until a constant weight is achieved, and record those weights to an accuracy of 0.001. If the weights of Consistency 1 and Consistency 2 are not within ±0.001% of each other, repeat the consistency determination until they are. Average the two weights to obtain a final result.

To perform a dilution test, take 500 grams of the thoroughly mixed sample and dilute it to 1,000 grams with water. Record the precise weight. Calculate the actual concentrations using values of 0.0188 g/L for softwood, or 0.0094 g/L for hardwood. Take 100 grams of the diluted sample, and dilute that to 1,000 grams with water. Again, record the exact weights, and calculate the actual concentrations; this time, use values of 0.00188 g/L for softwood, or 0.00094 g/L for hardwood. The target weight for measurement is 1.25 mg for softwood, and 0.50 mg for hardwood. This should yield calculations of 0.00125/0.0188=66.49 g for softwood, and 0.0005/0.0094=53.19 g for hardwood. Thoroughly mix the sample, quickly pour it into a beaker, and record the pour weight, calculating the exact amount used.

Prepare duplicate samples for each test, and measure samples within two hours of dilution (as over time, the fibers may straighten out, or the microfibrils may detach from the fibers; either of these will change the fiber length distribution and coarseness values).

Stretch & MD, CD, and Wet CD Tensile Strength Testing

An Instron 3343 tensile tester, manufactured by Instron of Norwood, MA, with a 100N load cell and 25.4 mm rubber coated jaw faces was used for tensile strength measurement. Prior to measurement, the Instron 3343 tensile tester was calibrated. After calibration, 8 strips of 2-ply product, each 2.54 cm by 10.16 cm (one inch by four inches), were provided as samples for each test. When testing MD (Material Direction) tensile strength, the strips are cut in the MD direction. When testing CD (Cross Direction) tensile strength, the strips are cut in the CD direction. One of the sample strips was placed in between the upper jaw faces and clamp, and then between the lower jaw faces and clamp with a gap of 5.08 cm (2 inches) between the clamps. A test was run on the sample strip to obtain tensile and stretch. The test procedure was repeated until all the samples were tested. The values obtained for the eight sample strips were averaged to determine the tensile strength of the tissue. When testing CD wet tensile strength, the strips are placed in an oven at 105 degrees Celsius for 5 minutes and saturated with 75 microliters of deionized water immediately prior to pulling the sample.

Caliper Testing

A Thwing-Albert ProGage 100 Thickness Tester, manufactured by Thwing Albert of West Berlin, NJ was used for the caliper test. Eight 100 mm×100 mm square samples were cut from a 2-ply product. The samples were then tested individually and the results were averaged to obtain a caliper result for the base sheet.

Porosity (Air Permeability) Testing

For oven-drying: 5 sheets of each sample were placed in an oven at 105° C. and dried for 6 hours. The wipes were allowed to equilibrate at room conditions overnight before testing.

For washing and oven-drying: 5 sheets of each sample were rinsed thoroughly with 500 mL of room temperature deionized (DI) water, then placed in an oven at 105° C. and dried for 6 hours. The wipes were allowed to equilibrate at room conditions overnight before testing.

The equipment used was a Textest FX3300 Air Permeability Tester using ATSM procedure D737. All data was in cubic feet of air per minute (cfm).

The following Examples illustrate the advantages of the present invention.

SINGLE PLY EXAMPLES

Example 1

Multiple hand sheets were produced using TAD/ATMOS technology. The samples were formed on a dynamic sheet former with basis weight ranging from 50 gsm to 70 gsm. The basesheet was produced with 70 to 100% softwood fibers and 0 to 30% tencel fibers. The tissue samples according to Example 1 were produced with addition of a temporary wet strength additive at a concentration of 0.01 to 0.5% range, Hercobond 1194 (Ashland, 500 Hercules Road, Wilmington Del., 19808) to the thick stock.

Example 2

Multiple hand sheets were produced using TAD/ATMOS technology. The samples were formed on a dynamic sheet former with basis weight ranging from 50 gsm to 70 gsm. The sample basesheets were produced with 70 to 100% softwood fibers, 0 to 30% tencel fibers and 0 to 20% hemp fibers. The tissue samples according to Example 2 were produced with addition of a temporary wet strength additive at a concentration of 0.1 to 0.5% range, Hercobond 1194 (Ashland, 500 Hercules Road, Wilmington Del., 19808) to the thick stock.

Example 3

Multiple hand sheets were produced using TAD/ATMOS technology. The samples were formed on a dynamic sheet former with basis weight ranging from 50 gsm to 70 gsm. The basesheet samples were produced with 70 to 100% softwood fibers and 0 to 30% tencel fibers. The tissue samples according to Example 3 were produced with addition of a temporary wet strength additive at a concentration of 0.1 to 0.5% range, Hercobond 1194 (Ashland, 500 Hercules Road, Wilmington Del., 19808) to the thick stock and carboxyl methyl cellulose (CMC) from Ashland Inc., at a concentration of 0 to 0.25% on the weight of fiber.

Example 4

Multiple hand sheets were produced using TAD/ATMOS technology. The samples were formed on a dynamic sheet former with basis weight ranging from 50 gsm to 70 gsm. The basesheet samples were produced with 70 to 100% softwood fibers, 0 to 30% tencel fibers and 0 to 20% hemp fibers. The tissue samples according to Example 4 were produced with addition of a temporary wet strength additive at a concentration of 0.1 to 0.5% range, Hercobond 1194 (Ashland, 500 Hercules Road, Wilmington Del., 19808) to the thick stock and carboxyl methyl cellulose (CMC) from Ashland Inc., at a concentration of 0 to 0.25% on the weight of fiber.

Comparative Example 1

Multiple hand sheets were produced using TAD/ATMOS technology. The samples were formed on a dynamic sheet former with basis weight ranging from 50 gsm to 70 gsm. The basesheet samples were produced with 70 to 100% softwood fibers and 0 to 30% tencel fibers.

Table 1 shows specifications and physical properties for Comparative Examples 1A-1D as compared to Examples 1A-1D.

TABLE 1

|  | BW | Additive | Conc. | SW:Tencel |
|---|---|---|---|---|
| Comparative Example 1A | 50 | None | n/a | 90/10 |
| Comparative Example 1B | 60 | None | n/a | 90/10 |
| Comparative Example 1C | 60 | None | n/a | 85/15 |
| Comparative Example 1D | 60 | None | n/a | 80/20 |
| Example 1A | 50 | GPAM | 0.25 | 90/10 |
| Example 1B | 60 | GPAM | 0.25 | 90/10 |
| Example 1C | 60 | GPAM | 0.25 | 85/15 |
| Example 1D | 60 | GPAM | 0.25 | 80/20 |

TABLE 2

| Test Parameter | Method | UOM | Flushable | | | | | |
| | | | Hydraspun (Suominem) | GP-AirSpun | KC-Cottonelle | Ex. 2 | Ex. 3 | Ex. 4 |
|---|---|---|---|---|---|---|---|---|
| Basis Weight | WSP 130.1 | g/m$^2$ | 60 | 75 | 80 | 60 | 60 | 60 |
| Thickness (Wet/Converted) | WSP 120.1 | mm | 0.44 | 0.49 | 0.47 | 0.31 | 0.35 | 0.35 |
| Tensile Strength MD (Wet) | ERT 20.2-89 | N/5 cm | 8 | 5 | 10 | 4 | 4 | 5 |
| Tensile Strength CD (Wet) | ERT 20.2-89 | N/5 cm | 5 | 3 | 8 | 2 | 2 | 3 |

The results summarized in Table 2 suggest that the basesheet produced in accordance with the present invention has lower bulk than competitor products and matches close on the tensile strength with the airspun web made by Georgia Pacific even though the basis weight is lower than GP's Airspun product.

Comparative Example 2

Multiple hand sheets were produced using TAD/ATMOS technology. The samples were formed on a dynamic sheet former with basis weight ranging from 50 gsm to 70 gsm. The basesheet samples were produced with 70 to 100% softwood fibers, 0 to 30% tencel fibers and 0 to 20% hemp fibers. Table 3 compares Example 2 with Comparative Example 2, which is a commercial flushable wipe sold by Kimberly-Clark.

TABLE 3

| Cell | % SW | % Hemp | % Tencel | GPAM Spray, % | MD dry Strength, N/m | MD wet Strength | Wet sheet Stretch % |
|---|---|---|---|---|---|---|---|
| Comparative Example 2 | 80 | 0 | 20 | 0 | 1252 | 149.5 | 17.4 |
| Example 2A | 60 | 20 | 20 | 0 | 1705 | 56.9 | 5.5 |
| Example 2B | 60 | 20 | 20 | 0.25 | 2105 | 61.3 | 3.3 |

TABLE 4

| Sample | Wet Strength Ball Burst Maximum Force | GSM | Bulk |
|---|---|---|---|
| Cottonelle Kleenex K.C. | 1.275 | 75 gsm | 463.6 |
| Pull-ups Big Kid K.C. | 1.4 | 75 gsm | 450.3 |
| Example 2B - un-creped | 0.7 | 55 gsm | 299.1 |
| Example 2B - creped | 0.9 | 55 gsm | 308.8 |

The results summarized in Table 4 suggest that the basesheet produced in accordance with the present invention has lower bulk than competitor products and has lower wet ball burst strength than competitor products, making it easily flushable and dispersible compared to competitor products.

MULTI-PLY EXAMPLES

The following three Examples were performed on two-ply samples formed in accordance with the present invention and on wipes available from other sources further illustrate advantages of the present invention. Test results for the examples are listed in Tables 5, 6 and 7 below.

Example 5

A flat pack of 2-ply pre-moistened wipes (30% solids) with dimensions of 5.25 inches by 7 inches were manufactured using the wet-laid TAD process and laminated using the DEKO emboss method with a vinyl acetate-ethylene copolymer binder. The resulting 2-ply product, as shown in Table 5, has the following product attributes: Basis Weight 85 g/m², Caliper 0.625 mm, MD tensile of 75 N/m, CD tensile of 62 N/m, an MD stretch of 15.5%, and CD stretch of 8%.

The wipe web was formed on a wet laid TAD asset with a twin wire solid C-wrap former with a 3 layer headbox. The furnish to each outer layer was composed of 50% El Dorado Eucalyptus pulp, 40% Grand Prairie NBSK, and 10% 6 mm Lyocel. The NBSK and Lyocell were co-refined in a conical refiner imparting 80 kwh/ton. The center layer was composed of 80% Grand Prairie NBSK and 20% 6 mm Lyocell fiber co-refined in a conical refiner imparting 80 kwh/ton. Three kg/ton of a copolymer of glyoxal (DPD-589 from Solenis, 500 Hercules Road, Wilmington Del., 19808) was added to the co-refined NBSK and Lyocell at the discharge of the refiner. The fiber and chemicals mixtures were diluted to a solids of 0.5% consistency and fed to separate fan pumps which delivered the slurry to the triple layered headbox. The headbox pH was controlled to 7.0 by addition of a caustic to the thick stock before the fan pumps. The headbox deposited the slurry to a nip formed by a forming roll, an outer forming wire, and an inner fabric. The slurry was drained through the outer wire, which was a KT194-P design from Asten Johnson of Charleston, SC, and transferred to a plain weave inner wire. The web was then transferred to a structured TAD fabric with a 10 shed weave, 0.35 mm warp and 0.50 mm shute monofilament, at 15% wire crepe. A single slotted vacuum box of 18 mm with 35 kPa of vacuum was used to facilitate transfer to the structured fabric upon which the web traveled over a four slotted, each at 19 mm molding box, with 80 kPa of vacuum. The web was dried using two through air drier drums to 90% solids before being transferred to a steam heated yankee dryer cylinder. The Yankee dryer had 18 mg/m² of a PAE based adhesive applied as well as 45 mg/m² of a polyvinyl alcohol and 3 mg/m² of a release oil applied using a double overlap spraybar. The sheet was creped from the Yankee dryer using a 45 degree ceramic blade at 98% solids and reeled into parent rolls.

Two wipe parent roll webs were laminated together using embossing in the DEKO configuration (only the top sheet is embossed with binder applied to the inside of the top sheet at the high points derived from the embossments using a binder supplied by an applicator roll) with the second exterior layer of each web facing each other. The top sheet emboss roll was a flat roll with no embossments leading to 100 contact with the applicator roll. The binder used was a copolymer of vinyl acetate-ethylene dispersion purchased from Wacker of Munchen, Germany under the product name of VINNAPAS® EP907. The binder was diluted to 25% solids and mixed with boric acid at a concentration of 0.5% to prevent the binder from dissolution when saturated in a wetting solution. The laminated wipes were then cut to size and packaged in a wetting solution to a solids concentration of 30%. The wetting solution was 98% purified water, with the remainder a mixture of humectants, preservatives, moisturizers, surfactants, chelating agents, pH buffer, and aromatic compounds.

Example 6

A flat pack of 2-ply pre-moistened wipes (30% solids) with dimensions of 5.25 inches by 7 inches were manufactured using the wet-laid TAD process and laminated using the DEKO emboss method with a vinyl acetate-ethylene copolymer binder. The resulting 2-ply product, as shown in Table 5, has the following product attributes: Basis Weight 84 g/m², Caliper 0.744 mm, MD tensile of 63 N/m, CD tensile of 55 N/m, an MD stretch of 13.4%, and CD stretch of 8.7%.

The wipe web was formed on a wet laid TAD asset with a twin wire solid C-wrap former with a 3 layer headbox. The furnish to each outer layer was composed of 50% El Dorado Eucalyptus pulp, 40% Grand Prairie NBSK, and 10% 6 mm Lyocel. The NBSK and Lyocell were co-refined in a conical refiner imparting 80 kwh/ton. The center layer was composed of 80% Grand Prairie NBSK and 20% 6 mm Lyocell fiber corefined in a conical refiner imparting 80 kwh/ton. Three kg/ton of glyoxalated polyacrylamide (Hercobond 1194 from Solenis of Wilmington, DE) was added to the corefined NBSK and Lyocell at the discharge of the refiner). The fiber and chemicals mixtures were diluted to a solids of 0.5% consistency and fed to separate fan pumps which delivered the slurry to the triple layered headbox. The headbox pH was controlled to 7.0 by addition of a caustic to the thick stock before the fan pumps. The headbox deposited the slurry to a nip formed by a forming roll, an outer forming wire, and an inner fabric. The slurry was drained through the outer wire, which was a KT194-P design from Asten Johnson of Charleston, SC, and transferred to a plain weave inner wire. The web was then transferred to a structured TAD fabric with a 10 shed weave, 0.35 mm warp and 0.50 mm shute monofilament, at 15% wire crepe. A single slotted vacuum box of 18 mm with 35 kPa of vacuum was used to facilitate transfer to the structured fabric upon which the web traveled over a four slotted, each at 19 mm molding box, with 80 kPa of vacuum. The web was dried using two through air drier drums to 90% solids before being transferred to a steam heated Yankee dryer cylinder. The Yankee dryer had 18 mg/m$^2$ of a PAE based adhesive applied as well as 45 mg/m$^2$ of a polyvinyl alcohol and 3 mg/m$^2$ of a release oil applied using a double overlap spraybar. The sheet was creped from the Yankee dryer using a 45 degree ceramic blade at 98% solids and reeled into parent rolls.

Two wipe parent roll webs were laminated together using embossing using the DEKO configuration (only the top sheet is embossed with glue applied to the inside of the top sheet at the high points derived from the embossments using an adhesive supplied by an applicator roll) with the second exterior layer of each web facing each other. The top sheet emboss roll used a pattern with 12.6% coverage with round elements 0.115 inches diameter and 0.135 inches in depth as shown in FIG. 4. The binder used was a copolymer of vinyl acetate-ethylene dispersion purchased from Wacker of Munchen, Germany under the product name of VINNAPAS® EN1267. The binder was diluted to 12.5% solids and cured at 105° C. in a heated chamber for approximately 15 minutes to prevent the binder from dissolution when saturated in a wetting solution. The laminated wipes were then cut to size and packaged in a wetting solution to a solids concentration of 30%. The wetting solution was 97.5% purified water, with the remainder a mixture of humectants, preservatives, moisturizers, surfactants, chelating agents, pH buffer, and aromatic compounds Example 7

A flat pack of 2-ply pre-moistened wipes (30% solids) with dimensions of 5.25 inches by 7 inches were manufactured using the wet-laid TAD process and laminated using the DEKO emboss method with a vinyl acetate-ethylene copolymer binder. The resulting 2-ply product, as shown in Table 5, has the following product attributes: Basis Weight 86 g/m$^2$, Caliper 0.720 mm, MD tensile of 114 N/m, CD tensile of 105 N/m, an MD stretch of 16.0%, and CD stretch of 8.48%.

The wipe web was formed on a wet laid TAD asset with a twin wire solid C-wrap former with a 3 layer headbox. The furnish to each layer was composed of 80% Grand Prairie NBSK and 20% 4 mm Lyocell fiber co-refined imparting 80 kwh/ton. 6 kg/ton of glyoxalated polyacrylamide (Hercobond 1194 from Solenis of Wilmington Del.) was added to the co-refined NBSK and Lyocell at the discharge of the refiner). The fiber and chemicals mixtures were diluted to a solids of 0.5% consistency and fed to separate fan pumps which delivered the slurry to the triple layered headbox. The headbox pH was controlled to 7.0 by addition of a caustic to the thick stock before the fan pumps. The headbox deposited the slurry to a nip formed by a forming roll, an outer forming wire, and an inner fabric. The slurry was drained through the outer wire, which was a KT194-P design from Asten Johnson, and transferred to a plain weave inner wire. The web was then transferred to a structured TAD fabric with a 10 shed weave, 0.35 mm warp and 0.50 mm shute monofilament, at 15% wire crepe. A single slotted vacuum box of 18 mm with 35 kPa of vacuum was used to facilitate transfer to the structured fabric upon which the web traveled over a four slotted, each at 19 mm molding box, with 80 kPa of vacuum. The web was dried using two through air drier drums to 90% solids before being transferred to a steam heated Yankee dryer cylinder. The Yankee dryer had 18 mg/m$^2$ of a PAE based adhesive applied as well as 45 mg/m$^2$ of a polyvinyl alcohol and 3 mg/m$^2$ of a release oil applied using a double overlap spraybar. The sheet was creped from the Yankee dryer using a 45 degree ceramic blade at 98% solids and reeled into parent rolls.

Two wipe parent roll webs were laminated together using embossing using the DEKO configuration (only the top sheet is embossed with glue applied to the inside of the top sheet at the high points derived from the embossments using an adhesive supplied by an applicator roll) with the second exterior layer of each web facing each other. The top sheet emboss roll used a pattern with 13% coverage with round elements 0.115 inches diameter and 0.135 inches in depth. The binder used was a copolymer of vinyl acetate-ethylene dispersion purchased from Wacker of Munchen, Germany under the product name of VINNAPAS® EN1267. The binder was diluted to 25% solids and cured at 105° C. in a heated chamber for approximately 15 minutes to prevent the binder from dissolution when saturated in a wetting solution. The laminated wipes were then cut to size and packaged in a wetting solution to a solids concentration of 30%. The wetting solution was 98% purified water, with the remainder a mixture of humectants, preservatives, moisturizers, surfactants, chelating agents, pH buffer, and aromatic compounds.

All of the wipes formed in accordance with the present invention and described in Examples 5 to 7 above passed the slosh box disintegration test described in INDA FG502. They also passed a dispersion test method in which a wipe was placed in a 1 liter container filled with 500 ml of room temperature tap water, and the container with the lid secured was shaken for 30 seconds. In both tests, the samples disintegrated as intended.

Table 5 show comparative test results for the products made in accordance with the present invention that were tested in Examples 5, 6 and 7, and for commercially available products identified in the Table. The test results are shown for dry basis weight (i.e., without a wetting solution), wet basis weight (i.e., after the addition of a wetting solution), wet bulk, and Dry and Wet MD and CD strength and stretch.

The tests confirm that the present invention is advantageous as it provides a wet wipe that is strong and stretchable when dry as the sample wipes had a relatively high Dry MD and CD Strength and Stretch values. However, the same wet wipes are flushable and dispersible given the relatively low Wet MD and CD Strength and Stretch values.

TABLE 5

| Sample ID | Dry Basis wt (gsm) | Wet Basis wt (gsm) | Wet Bulk (μm) | Dry MD Strength (N/m) | Dry MD Stretch (%) | Wet MD Strength (N/m) | Wet MD Stretch (%) | Dry CD Strength (N/m) | Dry CD Stretch (%) | Wet CD Strength (N/m) | Wet CD Stretch (%) |
|---|---|---|---|---|---|---|---|---|---|---|---|
| Ex. 5 | 84.93 | 318.88 | 622.30 | 826.89 | 14.61 | 74.78 | 15.57 | 797.41 | 7.09 | 61.48 | 8.25 |
| Ex. 6 | 83.75 | 306.80 | 744.10 | 647.33 | 11.35 | 63.27 | 13.37 | 629.67 | 6.55 | 55.25 | 8.72 |
| Ex. 7 | 86.43 | 336.87 | 721.10 | >1000 | n/a | 114.51 | 15.97 | >1000 | n/a | 104.80 | 8.48 |
| Dynarex July-August 2014 | 48.97 | 157.90 | 367.63 | 312.90 | 8.66 | 112.47 | 21.07 | 168.58 | 23.62 | 56.19 | 38.71 |
| Cottonelle FC - January 2015 | 78.61 | 237.19 | 408.73 | >1000 | n/a | 127.60 | 14.03 | 522.34 | 12.98 | 62.79 | 19.73 |
| Kirkland - January 2015 | 68.51 | 216.85 | 468.93 | 480.47 | 10.96 | 268.31 | 30.66 | 237.48 | 26.03 | 157.51 | 60.83 |

Table 6 shows air porosity test results for the for the products made in accordance with the present invention that were tested in Examples 5, 6 and 7 as compared to test results for the commercially available products identified in the Table.

The air porosity test results highlight an advantage of the present invention. A flushable wipe needs to behave like a conventional bath tissue in the sense that it should sink and keep moving through the pipes, rather than linger in a particular spot where fibers can accumulate and eventually cause a blockage. The relatively low porosity offered by product formed in accordance with the present invention thus prevents clogged pipes. By comparison, commercially-available products with long fiber lengths may be classified as flushable and dispersible, but because of their long fiber lengths which take time to break up and the high cfm (cubic feet of air per minute) porosity values, they can cause sewer blockages.

TABLE 6

|  | Flush Away | Costco Kirkland Wipes | Walmart Great Value Wipes | Cottonelle regular | Cottonelle refill | Ex 5 | Ex 6 | Ex 7 |
|---|---|---|---|---|---|---|---|---|
| Test 1 | 162.00 | 125.00 | 212.00 | 334.90 | 48.00 | 59.40 | 25.30 | 30.80 |
| Test 2 | 160.00 | 146.00 | 187.00 | 326.00 | 47.90 | 57.80 | 25.90 | 30.90 |
| Test 3 | 151.00 | 130.00 | 207.00 | 315.00 | 40.40 | 29.30 | 25.50 | 31.80 |
| Test 4 | 144.00 | 126.00 | 206.00 | 307.00 | 39.80 | 55.30 | 24.20 | 30.50 |
| Test 5 | 156.00 | 144.00 | 210.00 | 346.00 | 42.80 | 56.40 | 26.30 | 31.50 |
| Test 6 | 158.00 | 125.00 | 183.00 | 347.00 | 43.40 | 55.70 | 26.50 | 30.70 |
| average (cfm) | 155.17 | 132.67 | 200.83 | 329.32 | 43.72 | 52.32 | 25.62 | 31.03 |
| stdev | 6.65 | 9.75 | 12.51 | 16.35 | 3.55 | 11.38 | 0.83 | 0.50 |

Table 7 shows the length weight weighted (LWW) average fiber length fiber for the products made in accordance with the present invention that were tested in Examples 5, 6 and 7 and for commercially available products. These measurements were made using the Fiber Quality Analyzer, as described in the Fiber Lengths Measurements test described above. The manufacturing processes described above are simplified by using materials with relatively short fiber length (as shown in Table 7) for the wet-laid process so that a stratified headbox can be used. Also, the relatively short fiber lengths avoid clogging and improve dispersability as compared to conventional flushable wipes.

TABLE 7

| Sample | Flush Away | Costco Kirkland Wipes | Walmart Great Value wipes | Cottonelle regular | Cottonelle refill | Ex. 5 | Ex. 6 | Ex. 7 |
|---|---|---|---|---|---|---|---|---|
| LWW (mm) | >10 mm | >10 mm | >10 mm | >10 mm | >10 mm | 3.9 mm | 3.6 mm | 3.6 mm |

While particular embodiments of the invention have been illustrated and described, it would be obvious to those skilled in the art that various other changes and modifications may be made without departing from the spirit and scope of the invention. It is therefore intended to cover in the appended claims all such changes and modifications that are within the scope of this invention.

What is claimed is:

1. A method of forming a multi-ply flushable wet wipe, comprising:
   forming two or more plies, each ply being formed according to the following method:
      wetlaying using a through air drying papermaking process first and second exterior layers and a foam formed middle layer so as to form a web, each of the first and second exterior layers comprising at least 50% by weight natural fibers and the foam-formed middle layer comprising synthetic fibers and at least 25% by weight natural fibers, the synthetic fibers having a length within the range of 1 mm and 20 mm;
      imprinting the web with a structured fabric; and
      drying the web; and
   applying a binder in a pattern on a surface of only one of the two or more plies;
   attaching the one of the two or more plies to another one of the two or more plies using the binder to form the multi-ply wipe; and
   adding a cleansing solution to the multi-ply wipe in an amount of 40% to 90% by weight of the wipe, wherein:
      the multi-ply flushable wet wipe has a thickness of 400 microns to 744 microns,
      the multi-ply flushable wet wipe has a cross direction wet strength greater than 20 N/m, and
      the multi-ply flushable wet wipe is dispersible as determined by the Slosh Box Disintegration Test set forth in INDA FG502.

2. The method of claim 1, further comprising the step of pre-drying the web after imprinting.

3. The method of claim 1, wherein the through air drying process comprises drying the web on a steam heated cylinder.

4. The method of claim 3, further comprising the step of removing the dried web from the steam heated cylinder.

5. The method of claim 4, wherein the step of removing comprises creping.

6. The method of claim 4, wherein the step of removing comprises blowing the dried web off the steam heated cylinder.

7. The method of claim 1, wherein the step of drying comprises use of a belt press.

* * * * *